United States Patent
Wang et al.

(10) Patent No.: US 10,324,768 B2
(45) Date of Patent: Jun. 18, 2019

(54) LIGHTWEIGHT RESTRICTED TRANSACTIONAL MEMORY FOR SPECULATIVE COMPILER OPTIMIZATION

(71) Applicant: Intel Corporation, Santa Clara, CA (US)

(72) Inventors: Cheng Wang, San Ramon, CA (US); Youfeng Wu, Palo Alto, CA (US); Sara S. Baghsorkhi, San Jose, CA (US); Albert Hartono, Santa Clara, CA (US); Robert Valentine, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 14/574,300

(22) Filed: Dec. 17, 2014

(65) Prior Publication Data

US 2016/0179586 A1    Jun. 23, 2016

(51) Int. Cl.
| | |
|---|---|
| *G06F 9/30* | (2018.01) |
| *G06F 9/52* | (2006.01) |
| *G06F 12/0875* | (2016.01) |
| *G06F 12/0817* | (2016.01) |

(52) U.S. Cl.
CPC .......... *G06F 9/528* (2013.01); *G06F 12/0828* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| | | | |
|---|---|---|---|
| 8,132,158 B2 | 3/2012 | Wang et al. | |
| 8,418,156 B2 * | 4/2013 | Wang | G06F 9/3834 712/245 |
| 2008/0126764 A1 * | 5/2008 | Wu | G06F 9/466 712/226 |
| 2014/0181580 A1 | 6/2014 | Bharadwaj et al. | |

* cited by examiner

*Primary Examiner* — Corey S Faherty
(74) *Attorney, Agent, or Firm* — Nicholson De Vos Webster & Elliott LLP

(57) ABSTRACT

Embodiments described herein utilize restricted transactional memory (RTM) instructions to implement speculative compile time optimizations that will be automatically rolled back by hardware in the event of a missed speculation. In one embodiment, a lightweight version of RTM for speculative compiler optimization is described to provide lower operational overhead in comparison to conventional RTM implementations used when performing SLE.

21 Claims, 20 Drawing Sheets

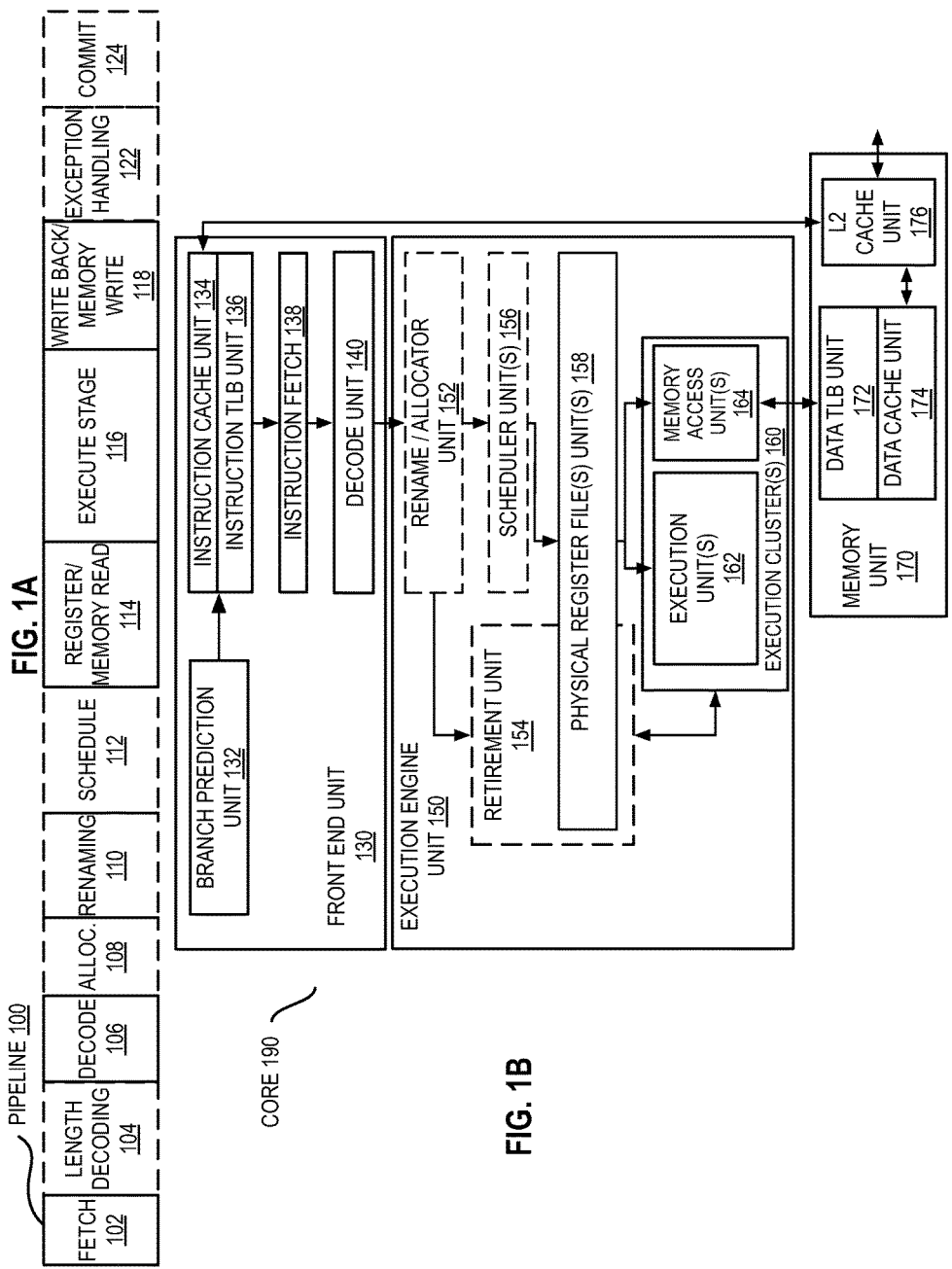

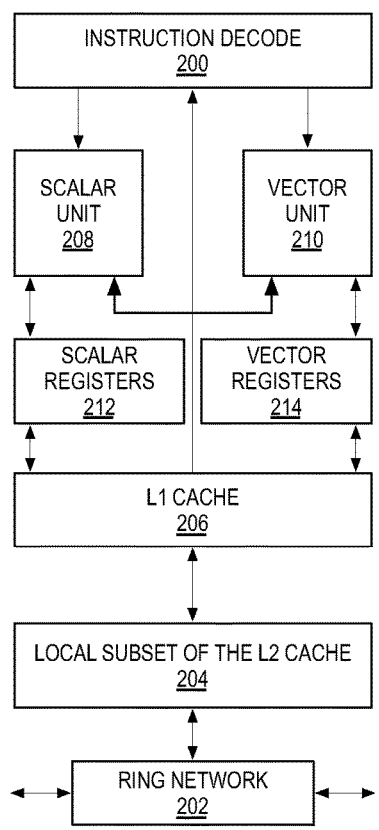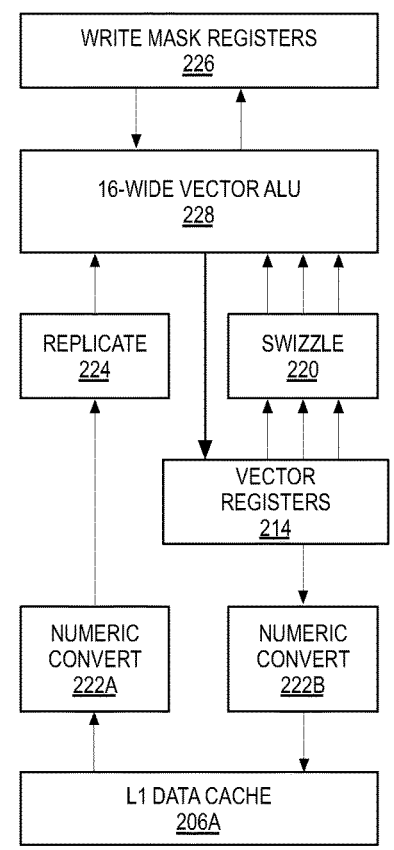

LIGHTWEIGHT RESTRICTED TRANSACTIONAL MEMORY FOR SPECULATIVE COMPILER OPTIMIZATION

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Locking is one common solution to manage shared data access in multiprocessor systems. Locking serializes data access, which maintains data integrity but may decrease overall performance. Speculative Lock Elision (SLE) may be used to reduce unnecessary serialization caused by concurrent processes that need to access the same lock-related variables or have to wait on the same lock queue. SLE dynamically removes unnecessary lock-induced serialization, relying on the property that locks do not always have to be acquired for a correct execution. Synchronization instructions that test or set locks are speculatively bypassed (e.g., elided). This allows multiple threads to concurrently execute critical sections protected by the same lock without having to actually acquire the lock. Missed speculation due to inter-thread data conflicts may be detected and the speculative instructions can be rolled back by a recovery mechanism. Successful speculative elision may then be validated and committed without acquiring the lock.

DESCRIPTION OF THE FIGURES

Embodiments are illustrated by way of example and not limitation in the Figures of the accompanying drawings, in which:

FIG. 1A is a block diagram illustrating both an exemplary in-order fetch, decode, retire pipeline and an exemplary register renaming, out-of-order issue/execution pipeline according to embodiments;

FIG. 1B is a block diagram illustrating both an exemplary embodiment of an in-order fetch, decode, retire core and an exemplary register renaming, out-of-order issue/execution architecture core to be included in a processor according to embodiments;

FIG. 2A-2B are block diagrams of a more specific exemplary in-order core architecture

FIGS. 17A-17D are block diagrams illustrating an exemplary specific vector friendly instruction format according to embodiments of the invention.

DETAILED DESCRIPTION

Figure 3:
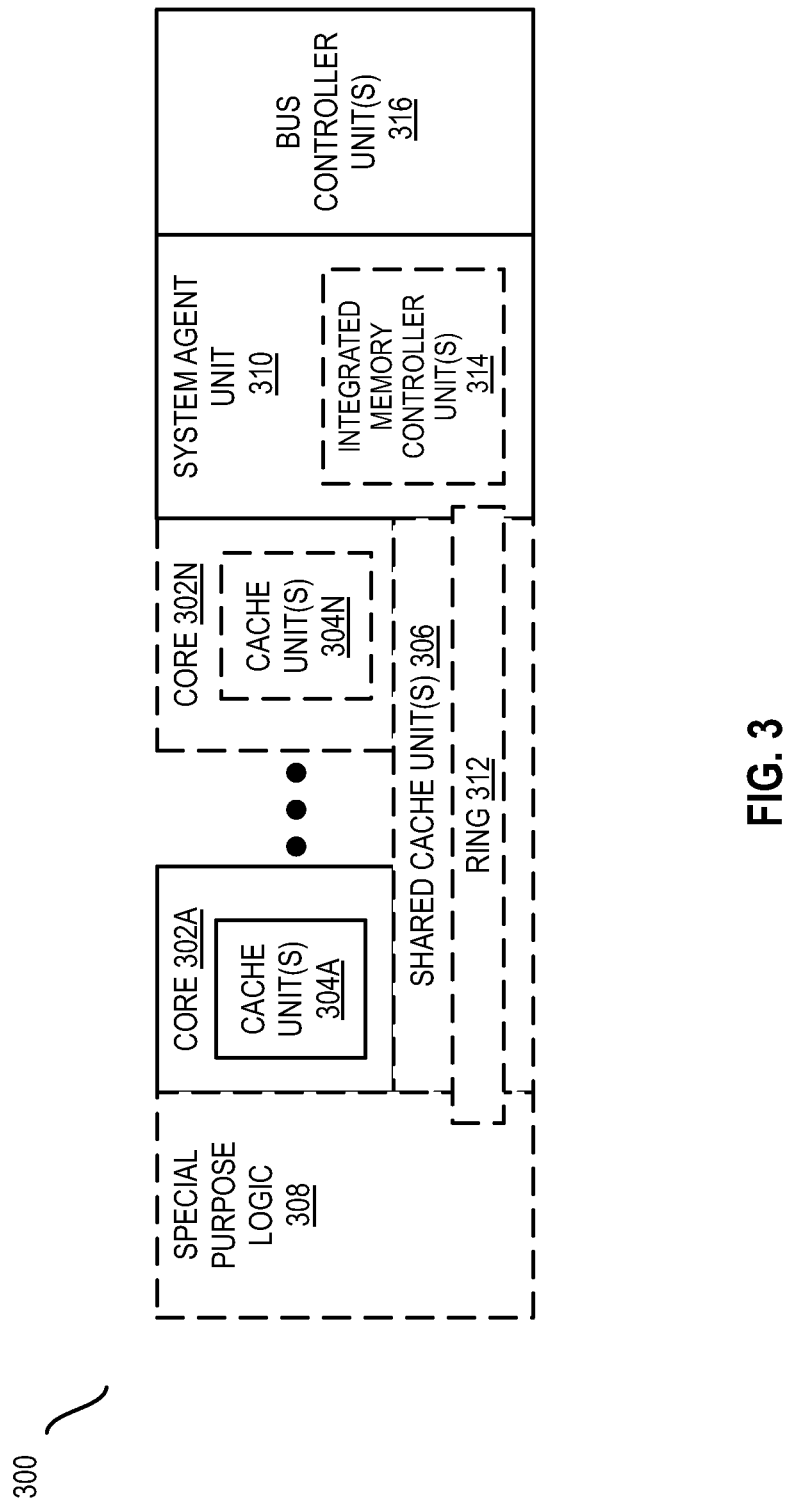
FIG. 3 is a block diagram of a single core processor and a multicore processor with integrated memory controller and special purpose logic.

SLE can be implemented using a hardware implementation of restricted transactional memory (RTM). RTM provides a speculative execution mechanism for a region of code (called an RTM region) such that the region execution can be rolled back in case of a missed speculation. Processors can implement RTM transactions using any number of mechanisms. In one embodiment, a processor performs speculative transactions in a restricted, internal region of memory that is not visible to other threads. If no memory conflicts exist with other concurrently executing threads the transaction is atomically committed to globally visible memory.

Besides speculative lock elision, optimizing compilers can be configured to perform speculative compiler optimizations using RTM. For example, when a frequently executed loop is determined to be data parallel, an optimizing compiler can attempt to vectorize the loop if the target processor architecture contains vector or single instruction multiple data (SIMD) hardware. It may be unsafe to perform optimizations such as loop vectorization for loops having cross-iteration memory dependences. However, an embodiments described herein utilize a RTM instructions to implement speculative compile time optimizations that will be automatically rolled back by hardware in the event of a missed speculation. In one embodiment, a lightweight version of RTM for speculative compiler optimization is described, which provides lower operational overhead in comparison to conventional RTM implementations used when performing speculative compiler optimizations.

Described below are processor core architectures, followed by descriptions of exemplary processors and computer architectures, compiler optimizations using an exemplary RTM implementation, and a lightweight RTM descriptions, according to embodiments. Numerous specific details are set forth in order to provide a thorough understanding of the embodiments of the invention described below. It will be apparent, however, to one skilled in the art that the embodiments may be practiced without some of these specific details. In other instances, well-known structures and devices are shown in block diagram form to avoid obscuring the underlying principles of the embodiments of the invention.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (e.g., many integrated core processors). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality.

Exemplary Core Architectures

In-Order and Out-of-Order Core Block Diagram

FIG. 1A is a block diagram illustrating an exemplary in-order pipeline and an exemplary register renaming out-of-order issue/execution pipeline, according to an embodiment. FIG. 1B is a block diagram illustrating both an exemplary embodiment of an in-order architecture core and an exemplary register renaming, out-of-order issue/execution architecture core to be included in a processor according to an embodiment. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general-purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM® instruction set (with optional additional extensions such as NEON) of ARM Holdings of Cambridge, England), including the instruction(s) described herein. In one embodiment, the core 190 includes logic to support a packed data instruction set extension (e.g., AVX1, AVX2, etc.), allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading Technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 2A-B are block diagrams of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 2A is a block diagram of a single processor core, along with its connection to the on-die interconnect network 202 and with its local subset of the Level 2 (L2) cache 204, according to an embodiment. In one embodiment, an instruction decoder 200 supports the x86 instruction set with a packed data instruction set extension. An L1 cache 206 allows low-latency accesses to cache memory into the scalar and vector units. While in one embodiment (to simplify the design), a scalar unit 208 and a vector unit 210 use separate register sets (respectively, scalar registers 212 and vector registers 214) and data transferred between them is written to memory and then read back in from a level 1 (L1) cache 206, alternative embodiments may use a different approach (e.g., use a single register set or include a communication path that allow data to be transferred between the two register files without being written and read back).

The local subset of the L2 cache 204 is part of a global L2 cache that is divided into separate local subsets, one per processor core. Each processor core has a direct access path to its own local subset of the L2 cache 204. Data read by a processor core is stored in its L2 cache subset 204 and can be accessed quickly, in parallel with other processor cores accessing their own local L2 cache subsets. Data written by a processor core is stored in its own L2 cache subset 204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 2B is an expanded view of part of the processor core in FIG. 2A according to an embodiment. FIG. 2B includes an L1 data cache 206A part of the L1 cache 204, as well as more detail regarding the vector unit 210 and the vector registers 214. Specifically, the vector unit 210 is a 16-wide vector processing unit (VPU) (see the 16-wide ALU 228), which executes one or more of integer, single-precision float, and double-precision float instructions. The VPU supports swizzling the register inputs with swizzle unit 220, numeric conversion with numeric convert units 222A-B, and replication with replication unit 224 on the memory input. Write mask registers 226 allow predicating resulting vector writes.

Processor with Integrated Memory Controller and Special Purpose Logic

FIG. 3 is a block diagram of a processor 300 that may have more than one core, may have an integrated memory controller, and may have integrated graphics according to an embodiment. The solid lined boxes in FIG. 3 illustrate a processor 300 with a single core 302A, a system agent 310, a set of one or more bus controller units 316, while the optional addition of the dashed lined boxes illustrates an alternative processor 300 with multiple cores 302A-N, a set of one or more integrated memory controller unit(s) 314 in the system agent unit 310, and special purpose logic 308.

Thus, different implementations of the processor 300 may include: 1) a CPU with the special purpose logic 308 being integrated graphics and/or scientific (throughput) logic (which may include one or more cores), and the cores 302A-N being one or more general purpose cores (e.g., general purpose in-order cores, general purpose out-of-order cores, a combination of the two); 2) a coprocessor with the cores 302A-N being a large number of special purpose cores intended primarily for graphics and/or scientific (throughput); and 3) a coprocessor with the cores 302A-N being a large number of general purpose in-order cores. Thus, the processor 300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring based interconnect unit 312 interconnects the integrated graphics logic 308, the set of shared cache units 306, and the system agent unit 310/integrated memory controller unit(s) 314, alternative embodiments may use any number of well-known techniques for interconnecting such units. In one embodiment, coherency is maintained between one or more cache units 306 and cores 302-A-N.

In some embodiments, one or more of the cores 302A-N are capable of multithreading. The system agent 310 includes those components coordinating and operating cores 302A-N. The system agent unit 310 may include for example a power control unit (PCU) and a display unit. The PCU may be or include logic and components needed for regulating the power state of the cores 302A-N and the integrated graphics logic 308. The display unit is for driving one or more externally connected displays.

The cores 302A-N may be homogenous or heterogeneous in terms of architecture instruction set; that is, two or more of the cores 302A-N may be capable of execution the same instruction set, while others may be capable of executing only a subset of that instruction set or a different instruction set.

Exemplary Computer Architectures

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
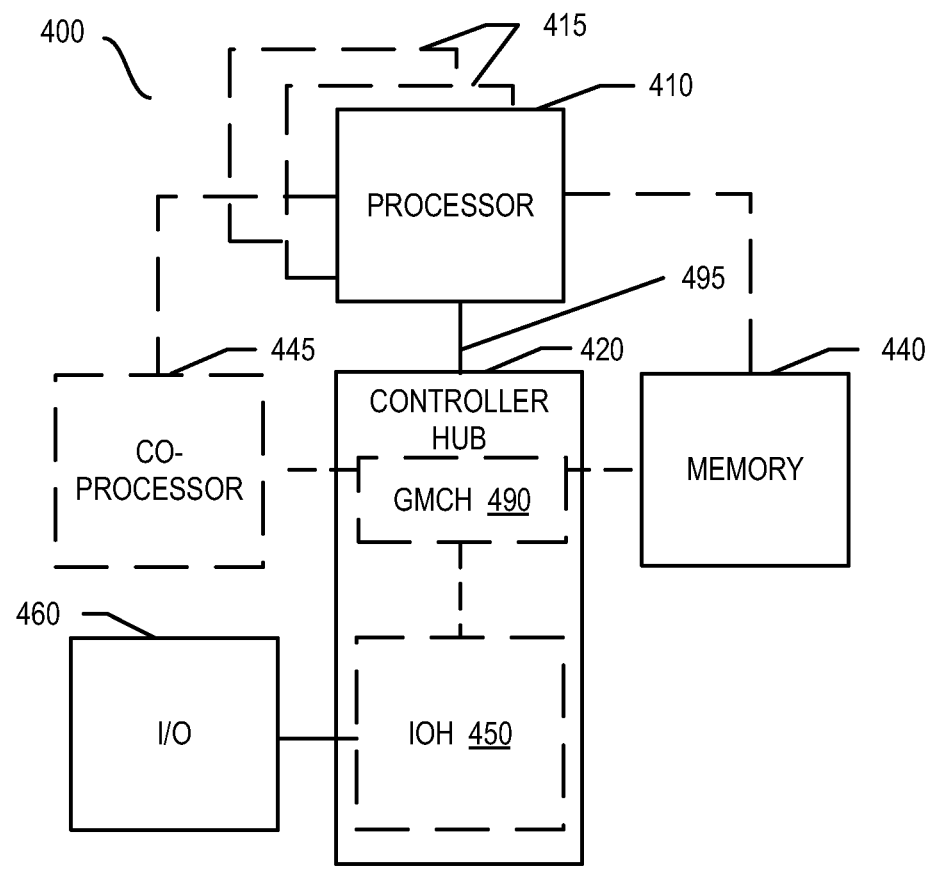
FIG. 4 illustrates a block diagram of a system in accordance with an embodiment.

Referring now to FIG. 4, shown is a block diagram of a system 400 in accordance with one embodiment of the present invention. The system 400 may include one or more processors 410, 415, which are coupled to a controller hub 420. In one embodiment the controller hub 420 includes a graphics memory controller hub (GMCH) 490 and an Input/Output Hub (IOH) 450 (which may be on separate chips); the GMCH 490 includes memory and graphics controllers to which are coupled memory 440 and a coprocessor 445; the IOH 450 is couples input/output (I/O) devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 300.

The memory 440 may be, for example, dynamic random access memory (DRAM), phase change memory (PCM), or a combination of the two. For at least one embodiment, the controller hub 420 communicates with the processor(s) 410, 415 via a multi-drop bus, such as a frontside bus (FSB), point-to-point interface such as QuickPath Interconnect (QPI), or similar connection 495.

In one embodiment, the coprocessor 445 is a special-purpose processor, such as, for example, a high-throughput MIC processor, a network or communication processor, compression engine, graphics processor, GPGPU, embedded processor, or the like. In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
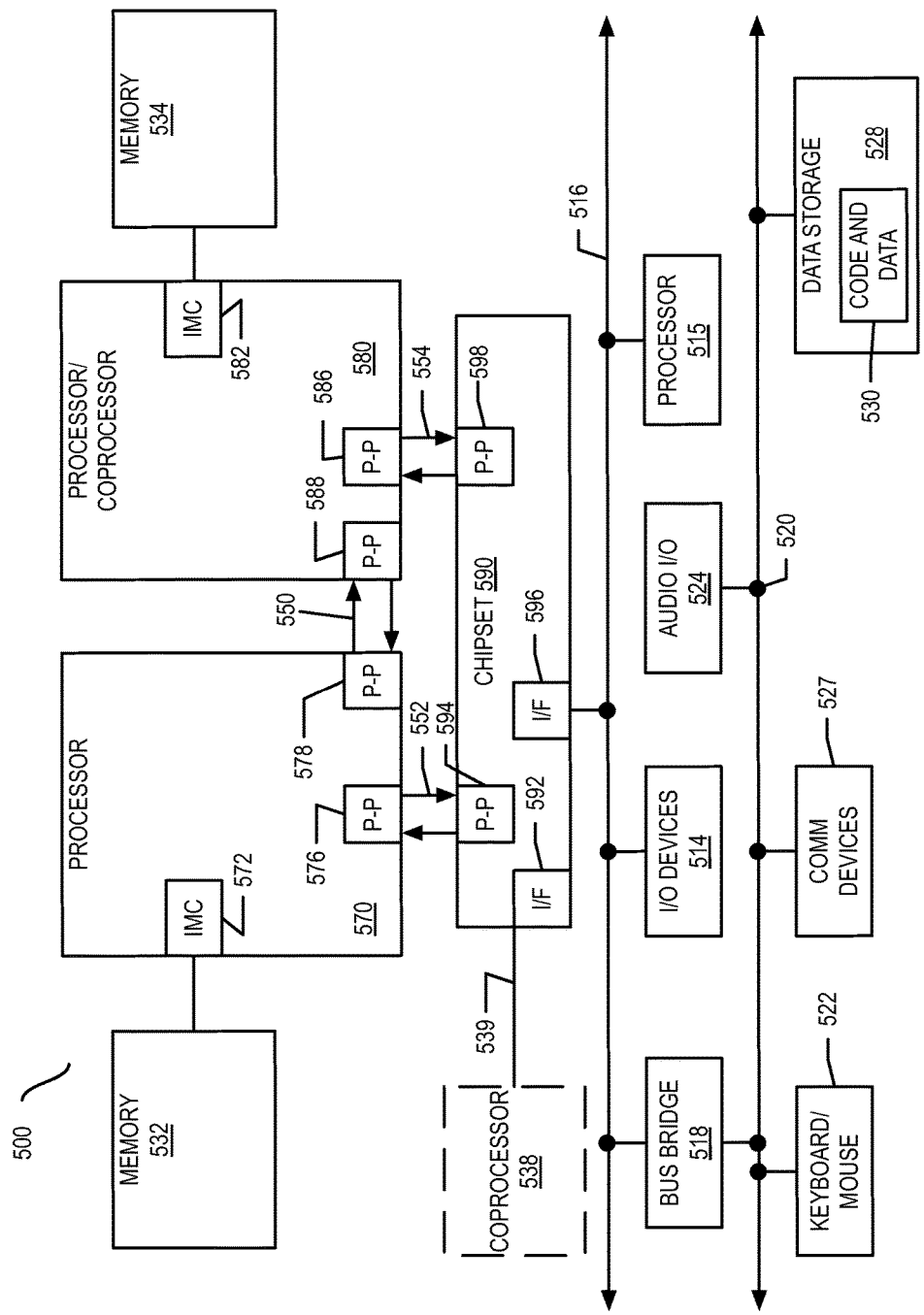
FIG. 5 illustrates a block diagram of a second system in accordance with an embodiment.

Referring now to FIG. 5, shown is a block diagram of a first more specific exemplary system 500 in accordance with an embodiment of the present invention. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300. In one embodiment of the invention, processors 570 and 580 are respectively processors 410 and 415, while coprocessor 538 is coprocessor 445. In another embodiment, processors 570 and 580 are respectively processor 410 coprocessor 445.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high-performance interface 539. In one embodiment, the coprocessor 538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to the second bus 520. Note that other architectures are possible. For example, instead of the point-to-point architecture of FIG. 5, a system may implement a multi-drop bus or other such architecture.

Figure 6:
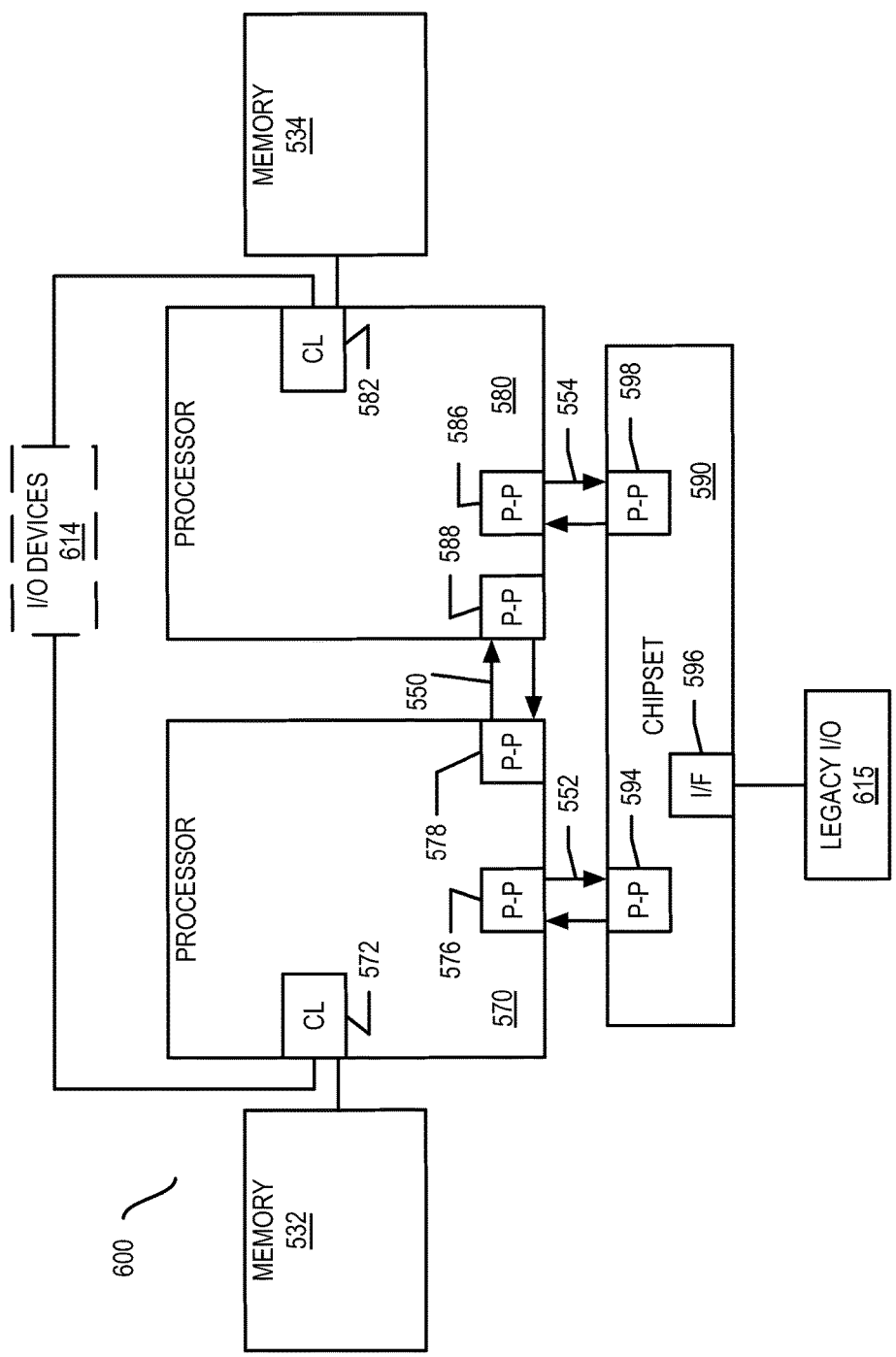
FIG. 6 illustrates a block diagram of a third system in accordance with an embodiment.

Referring now to FIG. 6, shown is a block diagram of a second more specific exemplary system 600 in accordance with an embodiment of the present invention Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 572 and 582, respectively. Thus, the CL 572, 582 include integrated memory controller units and include I/O control logic. FIG. 6 illustrates that not only are the memories 532, 534 coupled to the CL 572, 582, but also that I/O devices 614 are also coupled to the control logic 572, 582. Legacy I/O devices 615 are coupled to the chipset 590.

Figure 7:
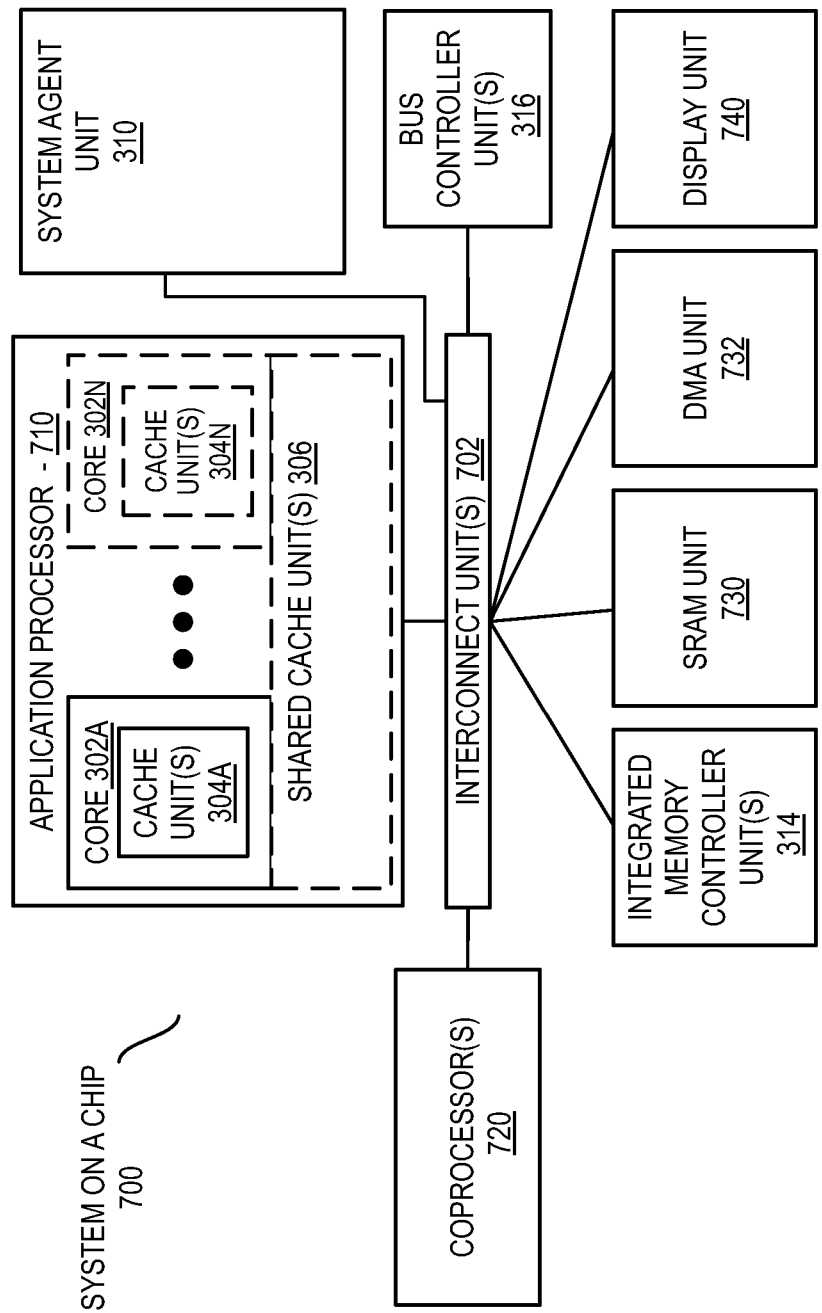
FIG. 7 illustrates a block diagram of a system on a chip (SoC) in accordance with an embodiment.

Referring now to FIG. 7, shown is a block diagram of a SoC 700 in accordance with an embodiment of the present invention. Similar elements in FIG. 3 bear like reference numerals. Also, dashed lined boxes are optional features on more advanced SoCs. In FIG. 7, an interconnect unit(s) 702 is coupled to: an application processor 710 which includes a set of one or more cores 202A-N and shared cache unit(s) 306; a system agent unit 310; a bus controller unit(s) 316; an integrated memory controller unit(s) 314; a set or one or more coprocessors 720 which may include integrated graphics logic, an image processor, an audio processor, and a video processor; an static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Embodiments of the mechanisms disclosed herein are implemented in hardware, software, firmware, or a combination of such implementation approaches. Embodiments are implemented as computer programs or program code executing on programmable systems comprising at least one processor, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), rewritable compact disks (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, an embodiment also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
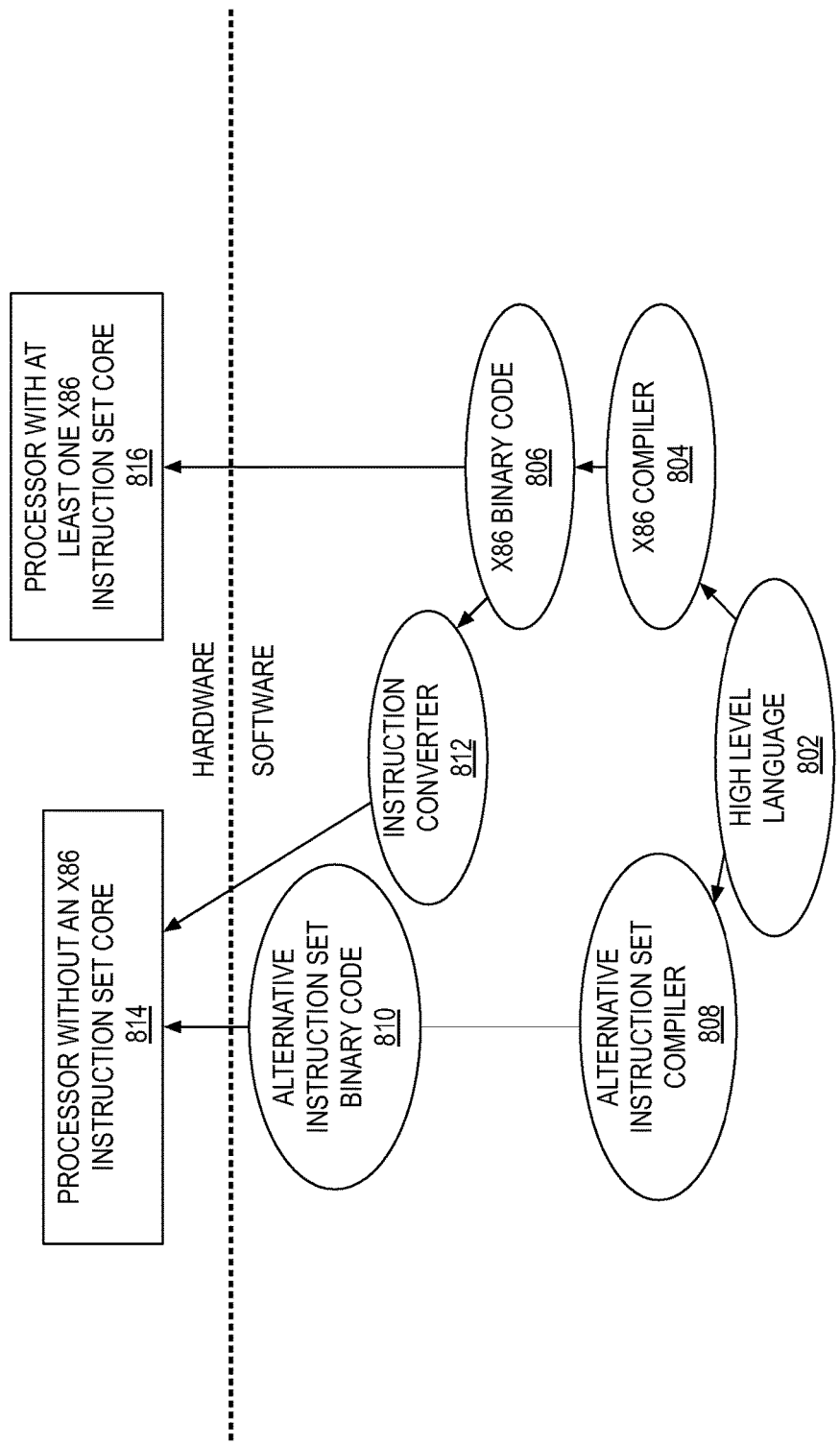
FIG. 8 illustrates a block diagram contrasting the use of a software instruction converter to convert binary instructions in a source instruction set to binary instructions in a target instruction set according to embodiments.

FIG. 8 is a block diagram contrasting the use of a software instruction converter to convert binary instructions in a source instruction set to binary instructions in a target instruction set according to an embodiment. In the illustrated embodiment, the instruction converter is a software instruction converter, although alternatively the instruction converter may be implemented in software, firmware, hardware, or various combinations thereof. FIG. 8 shows a program in a high level language 802 may be compiled using an x86 compiler 804 to generate x86 binary code 806 that may be natively executed by a processor with at least one x86 instruction set core 816.

The processor with at least one x86 instruction set core 816 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 804 represents a compiler that is operable to generate x86 binary code 806 (e.g., object code) that can, with or without additional linkage processing, be executed on the processor with at least one x86 instruction set core 816. Similarly, FIG. 8 shows the program in the high level language 802 may be compiled using an alternative instruction set compiler 808 to generate alternative instruction set binary code 810 that may be natively executed by a processor without at least one x86 instruction set core 814 (e.g., a processor with cores that execute the MIPS instruction set of MIPS Technologies of Sunnyvale, Calif. and/or that execute the ARM instruction set of ARM Holdings of Cambridge, England).

The instruction converter 812 is used to convert the x86 binary code 806 into code that may be natively executed by the processor without an x86 instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have an x86 instruction set processor or core to execute the x86 binary code 806.

Restricted Transactional Memory

Restricted transactional memory (RTM) provides a speculative execution mechanism for a region of code (called an RTM region) such that the region execution can be rolled back in case of a missed speculation. Processors can implement RTM transactions using any number of mechanisms. In one embodiment, a processor performs speculative transactions in a restricted region of memory that is not visible to other threads. If no memory conflicts exist with other concurrently executing threads the transaction is atomically committed to globally visible memory. In one embodiment, a lightweight version of RTM is enabled, which provides lower overhead in comparison to RTM implementations configured to perform speculative lock elision.

Figure 9:
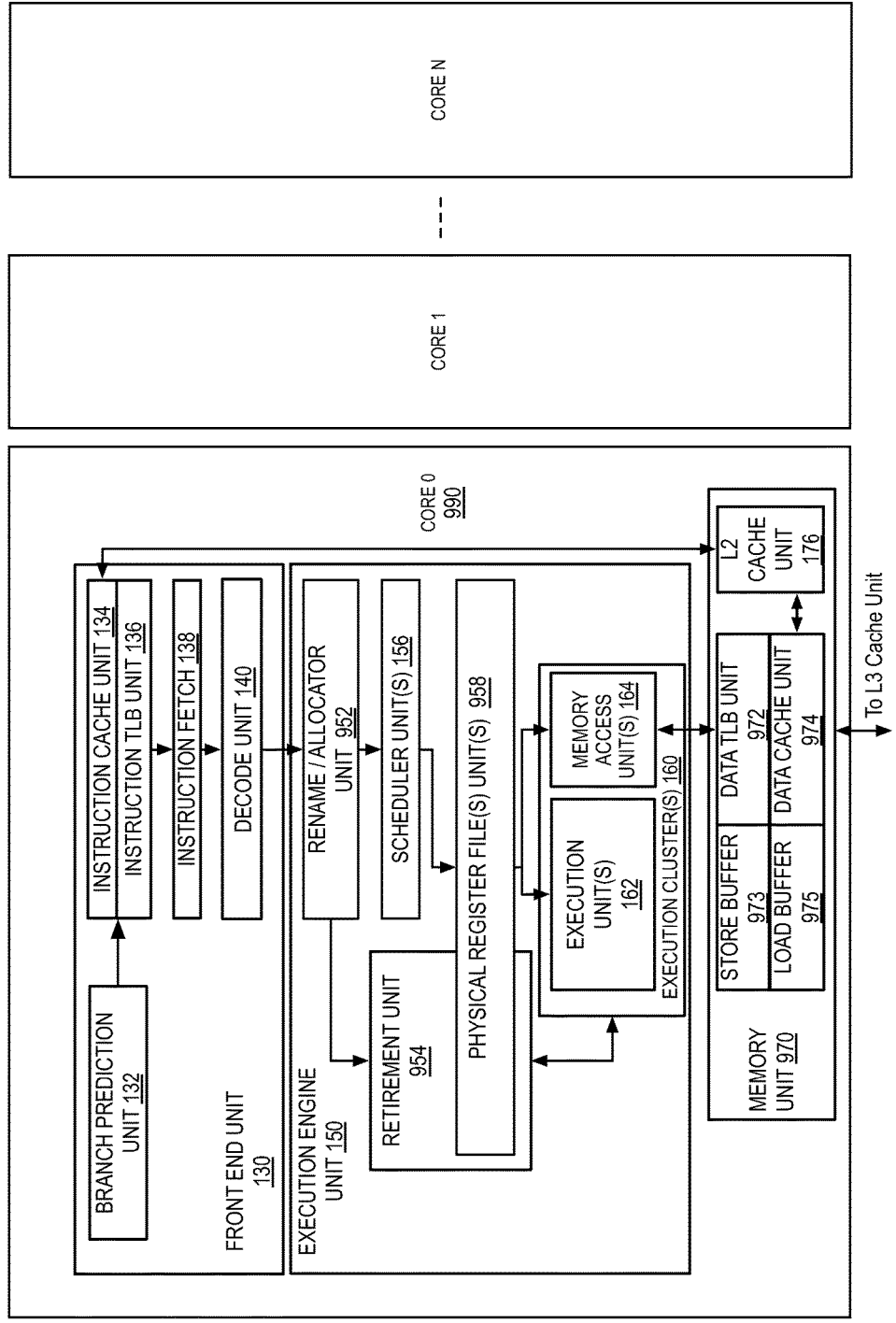
FIG. 9 is a block diagram of an exemplary processor in which embodiments may be implemented.

FIG. 9 is a block diagram of an exemplary processor in which embodiments may be implemented. The details of a single processor core 990 (e.g., Core 0) are illustrated for simplicity, although other cores (e.g., Cores 1-N may have similar logic). In one embodiment, the processor core 990 includes processor components illustrated in exemplary processor 190 of FIG. 1. Additionally, each core includes a dedicated memory unit 970 including a data TLB unit 972, a data cache unit (e.g., Level 1 (L1) cache), a store buffer 973, and a load buffer 975 that are configured to perform speculative transactional memory operations for an implementation of RTM. The rename/allocator unit 952, physical register file(s) unit(s) 958 and retirement unit 954 may also be modified to support an RTM implementation.

In one embodiment the processor core 990 is configured to execute memory instructions, including load (Ld) and store (St) instructions. A load instruction may read memory and retire after data associated with the load instruction is loaded into processor register in the physical register file(s) unit(s). In one embodiment, when a load is issued an entry in the load buffer 975 is reserved for the address. The entry in the load buffer 975 can be released once the instruction has retired and the load data is written into the physical register file(s) unit(s) 958.

A store instruction may be retired when data associated with the store instruction is transferred from processor register to a store buffer 973. The term "retire," as used herein, means that an instruction is executed by the CPU and leaves a CPU queue. In one embodiment, core 990 is an out-of-order core and when a store is issued for renaming and scheduling, an entry in the store buffer 973 is allocated for the address and the data for the store instruction. In one embodiment the store buffer 973 will hold the address and data of the store instruction until the instruction has retired and the data has been written to the data cache unit 974. A retired store instruction is referred to herein as a "senior store."

An RTM implementation can include an additional store buffer 973 for use as a senior store buffer, which stores retire stores for later flushing to globally visible memory. The senior store buffer can be used during a commit stage for an RTM region. In one embodiment, a commit occurs after load instructions and store instructions retire from the processor core. In one embodiment, the commit occurs in multiple stages. In a first commit stage, data associated with a load instruction can be read from an appropriate location in cache/memory and then loaded into a register. The load instruction is then retired. Data associated with a store instruction can be moved from a register and written to a store buffer, and the store instruction is retired. After the first commit stage, however, data associated with the retired store instruction (senior store) may remain in a store buffer waiting to be written to cache/memory in a second commit stage. Transactionally executing threads buffer transactions to a speculative cache while the senior store buffer is drained before committing the transaction to globally visible memory. In conventional, (e.g., SLE based) RTM implementations the commit may not occur unless the transaction can atomically commit without a data conflict with other executing threads, as further described below. In one embodiment, conflicts are detected using a modified cache coherency system.

Figure 10:
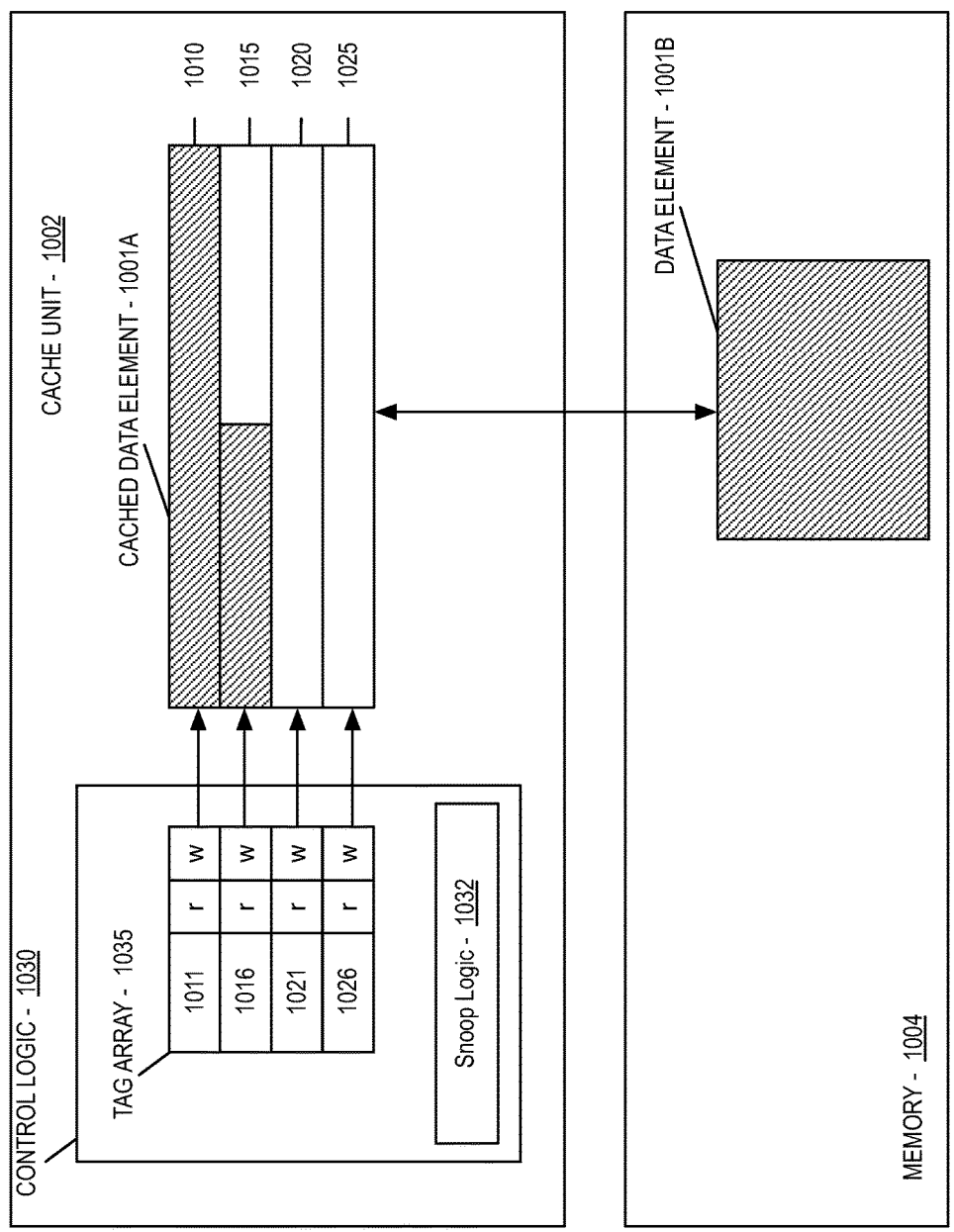
FIG. 10 is a block diagram of a cache configured to store speculative data for a restricted transactional memory implementation, according to an embodiment.

FIG. 10 is a block diagram of a cache configured to store speculative data for a restricted transactional memory implementation, according to an embodiment. In one embodiment, transactional loads and stores can be performed within a region of private (e.g., restricted) transactional memory, such as cache unit 1002. The cache unit 1002 may be any cache unit coupled to a processor, such as data cache unit 974 coupled to processor core 990 in FIG. 9. The cache unit 1002 includes multiple cache lines 1010, 1015, 1020, 1025. In one embodiment, control logic 1030 includes a tag array 1035 having a set of attributes indicating a transactional read 1011.*r*, 1016.*r*, 1021.*r*, 1026.*r* or a transactional write 1011.*w*, 1016.*w*, 1021.*w*, 1026.*w*.

In one embodiment, each pair of read and write attributes is associated with a cache line. For example, first read attribute 1011.*r* and first write attribute 1011.*w* are associated with a first cache line 1010. A second read attribute 1016.*r* and a second write attribute 1016.*w* are associated with a second cache line 1015. In one embodiment, the tag array 1035 additionally includes a coherency state array, where the attributes are included within the coherency state.

In one embodiment, the attributes 1011.*r*-1026.*r* and 1011.*w*-1026.*w* are used to indicate to a cache coherency system which data items or data elements, such as cached data element 1001A, are involved in transactional operations, such as a transactional load or a transactional store operation. For example, cached data element 1001A has been loaded in the cache unit 1002 as a result of a transactional load from data element 1001B in memory 1004. Cached data item 1001A occupies the entirety of the first cache line 1010 and half of the second cache line 1015. As a result, control logic 1030 updates fields 1011.*r* and 1016.*r* to indicate that a transactional load from cache lines 215 and 216 has occurred. For example, fields 1011.*r* and 1016.*r* may be updated to a monitored logical value, such as a logical one, from an unmonitored logical value, such as a logical zero. In the embodiment where tag array 1035 is a coherency state array, fields 1011 and 1016 are transitioned to appropriate coherency states, such as a monitored read shared coherency state.

In one embodiment, conflict logic is included within cache control logic 1030, or in associated therewith, to detect conflicts associated with the attributes. Based on design implementation, any combination of attribute states, requests, communication protocols, or coherency protocols may be utilized to determine a conflict exists. As a basic example, a write to a monitored read is potentially a conflict and a read or a write of a monitored write is potentially a conflict. In one embodiment, snoop logic 1032 in the control logic 1030 detects a conflict caused by a request to write to either cache line 1010 or 1015. Once a conflict is detected, in one embodiment, reporting logic reports the conflict for handling by the processor hardware, system firmware, or a combination thereof.

In one embodiment, a data conflict causes a processor implementing the transaction to abort the transaction. Upon an abort, the processor rolls back the transactional execution to restore the processor's state to a point before the transaction started. This may include discarding any memory updates performed up until the transaction abort. Execution may then continue non-transactionally.

Restricted Transactional Memory and Speculative Compiler Optimization

While existing processor based implementations of RTM are generally used to implement speculative lock elision (SLE) via hardware, where data access serialization is potentially prevented by removing unnecessary locks on data which is not concurrently access during speculative execution, optimizing compilers can be configured to perform speculative compiler optimizations using RTM. In particular, when a frequently executed loop is determined to be data parallel, an optimizing compiler can attempt to vectorize the loop if the target processor architecture contains vector or single instruction multiple data (SIMD) hardware. However, it is unsafe to vectorize loops having potential cross-iteration memory dependences that the compiler cannot resolve statically. In such case, the potential benefits of SIMD loop vectorization may go unrealized if these dependencies do not materialize at runtime or if these dependencies materialize very infrequently at runtime. Thus, the optimizing compiler can use RTM to implement a speculative optimization at compile time.

Figure 11:
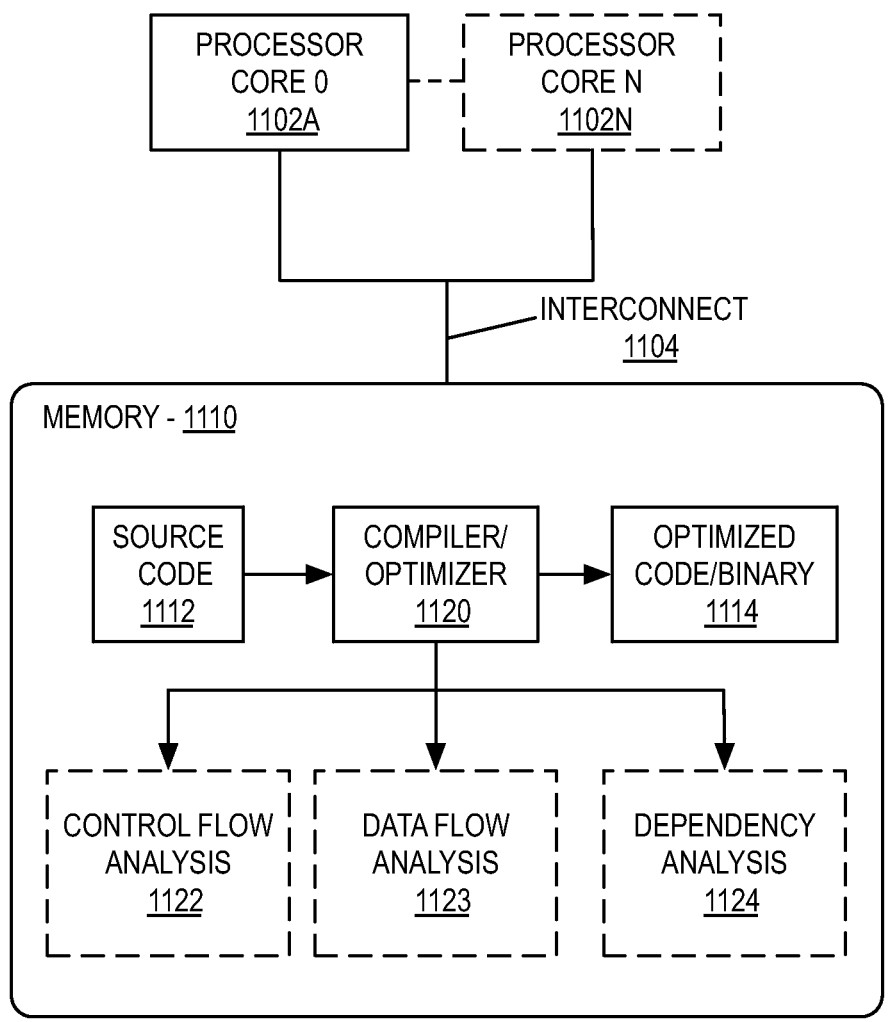
FIG. 11 is a block diagram illustrating a data processing system for implementing an optimizing compiler.

FIG. 11 is a block diagram illustrating a data processing system for implementing an optimizing compiler. The system includes one or more local or distributed processor cores 1102A-1102N, which couple via an interconnect 1104 (e.g., a high speed bus and/or packet network) to local or distributed memory 1110. The memory may include one or more secondary memory or storage devices, and may comprise virtual memory including data in either a volatile memory device or a non-volatile storage device. The memory 1110 includes source code 1112 and a compiler/optimizer 1120 to optimize the source code to create an optimized code/binary 1114.

In one embodiment, the source code 1112 includes instructions in a high level language (e.g., C, C++), a low level language (e.g., assembly language), or an intermediate language (e.g., LLVM intermediate representation). The compiler/optimizer 1120 can be a standalone compiler, and optimizer module, an architecture specific optimizer/compiler, a modular compilation system, or any other type of compiler or optimizer. The optimized code/binary 1114 can be one or more of several forms of program code, including a high level representation, an intermediate representation, a low level representation, or a compiled object binary. In one embodiment, the compiler/optimizer 1120 utilizes static analysis modules including but not limited to a control flow analysis module 1122, a data flow analysis module 1123, and a dependency analysis module 1124 to generate the optimized code/binary 1114. In one embodiment, the compiler/optimizer 1120 functionality for source code can be substituted with a binary optimizer and runtime profiling to optimize existing binaries.

An example of instructions that may benefit from speculative loop vectorization is shown in Table 1 below.

TABLE 1

| Code 1 |
| --- |
| (01) t = (some initial value) |
| (02) ... |
| (03) for(i = 0; i < 8; i++) { |
| (04)     A[i] = B[i] + t |
| (05)     if(A[i] < 0) // rarely true |
| (06)         t = (some other value) |
| (07) } |

Exemplary Code 1 in Table 1 shows exemplary source code 1112 as in FIG. 10. Code 1 includes a loop operation in lines (03) through (07) to assign the value of each element of array 'B' plus a variable 't' to array 'A'. Variable 't' has some initial value, which is set at line (1). However, the value of variable 't' may change at line (6) during the loop execution based upon a conditional branch at line (5). The conditional branch is taken for any element of array 'A' that is less than zero. In some circumstances the branch condition for updating 't' is rarely true. In one embodiment the compiler/optimizer 1120 determines the likelihood of the branch condition via the static analysis modules (e.g., 1122, 1123, 1124) or via branch prediction hints. If appropriate, the compiler/optimizer 1120 will vectorize the code to use a SIMD/vector instruction to speculatively update elements of array 'A' (e.g., A[i]) with an vector add of the elements of array 'B' and the scalar loop initial value of the variable 't'. In the rare case that the branch condition for updating the value of variable 't' is later determined to be true in a certain iteration of the loop, the loop execution can be rolled back using RTM logic and the original code can be run without speculation.

In one embodiment an optimizing compiler utilizes RTM hardware when optimizing Code 1 of Table 1 above to generate instructions represented by exemplary Code 2 of Table 2 below.

TABLE 2

| Code 2 |
| --- |
| (08) RTM_begin(offset) |
| (09) A[0:7] = B[0:7] + t; |
| (10) if(A[0:7] < 0) |
| (11)     RTM_abort(status); |
| (12) RTM_end( ); |
| Offset: (3-7) {(Code 1 // RTM fallback} |

As shown in Table 2, a speculative compiler optimization can be performed using a processor RTM implementation. In one embodiment, an optimizing compiler can insert markers into program code to specify the beginning (e.g., RTM_begin at line (8)) and end (e.g. RTM_end at line (12)) of an RTM region. In one embodiment, the markers are instruction provided by the processor instruction set. The optimizing compiler generates speculatively optimized versions of the original code and inserts the optimized code into the RTM region. As shown on line (09) the compiler can optimize the eight serially executed loop instructions of lines (3)-(7) of Code 1 using single SIMD instruction. The SIMD instruction adds multiple elements of array 'B' with a value specified by the initial value of the 't' variable and assign the results to multiple elements of array 'A.'

The optimization is conditional on the value of 't' not changing. Thus, in one embodiment the compiler inserts a vector instruction to check for the abort condition, as shown by line (10). An abort instruction is inserted, as shown by line (11) that is conditional upon the occurrence of the branch event that results in a change in the value of 't'. Although logical branching is show in in Code 2, the abort instruction may also be conditionally executed via predication or any other conditional method of instruction execution. As shown on line (11) in one embodiment an explicit abort may indicate an abort status to indicate a reason for the abort.

In one embodiment region begin marker at line (08) indicates the location of a set of fallback instructions to execute in the event of a missed speculation. The fallback instructions for Code 2 may an un-optimized, or a less aggressively optimized version of instructions from the original code, (e.g., line (3) through line (7) of Code 1).

Thus, in various embodiments, an optimizing compiler can implement speculative compiler optimizations using RTM instruction designed for speculative lock elision. However, existing implementations of speculative lock elision via RTM place two requirements on the execution of an RTM region, 1) a commitment requirement and 2) a rollback requirement. The commitment requirement states if an RTM region commits the region must appear to execute atomically without interleaving with other concurrent threads. The rollback requirement states that if an RTM region aborts the partially executed region must be completely rolled back without any side effect. The commit requirement and the rollback requirement help to ensure the correctness of execution for speculative lock elision and speculative transactions.

To achieve both the commit requirement and the rollback requirement, existing RTM implementations detect the memory conflicts for all load operations and store operations in the RTM region. For cache concurrency based transactional memory implementation, memory conflicts can be detected by setting speculative read/write bits in a cache located close to the processor and utilize that cache for all the load/store operations in the region (e.g., the read/write set for the transaction), as illustrated in FIG. 10. The cache memory system can then snoop conflicted accesses from concurrent threads via the read/write bits during the region execution until the region commit. The processor logic to implement both the commit requirement and the rollback requirement, however, introduces additional overhead to RTM based speculative optimization that may not be required when lock elision is not performed.

In one embodiment, a two-stage commit region implementation includes optimizations that reduce the overhead imposed by the RTM logic. One optimization in existing implementations includes delaying the global visibility of store instructions when those instructions are retired from the processor instruction pipeline. Non-globally observable stores within an RTM region can be placed into a 'senior' store buffer for retired store instructions without blocking later instruction retirement. This enables an out-of-order retire for those store instructions that can be atomically committed by making the stores in the senior store buffer globally visible using a single operation.

However, due to the commit requirement, the RTM region can commit only after all of the stores within the RTM region are globally visible. Thus, existing RTM implementations drain all pending stores in the senior store buffer, allowing the stores to become globally visible, before committing the region. In embodiments described herein, an RTM implementation is introduced to further reduce RTM overhead over and beyond existing RTM implementations to provide a lightweight RTM for use in speculative compiler optimization.

Lightweight Restricted Transactional Memory for Speculative Compiler Optimization Lightweight RTM for speculative compiler optimization only imposes the rollback requirement for rolling back the region in case of detection of mis-speculation, while removing the commit requirement blocking the lightweight RTM region commit. For lightweight RTM it is sufficient to ensure that when an RTM region aborts, all of the stores within the region are invisible to concurrent threads and can be completely rolled back without any side effect, which fulfills the rollback requirement. The commitment requirement may be eliminated because speculative lock elision is not performed using the lightweight RTM instructions.

As a result of the removal of a commit requirement blocking the commit of a lightweight RTM region, an embodiment eliminates conflict detection for load operations within a lightweight RTM region, while maintaining conflict detection for store operations within the region. In one embodiment, lightweight RTM does not include a requirement to drain the pending stores in the senior store buffer before committing the region. Thus, a region commit may be performed without waiting for all pending stores to be globally observable.

Code 3 is shown in Table 3 below, which is exemplary optimized code using lightweight RTM (e.g., ltrx) instructions.

TABLE 3

Code 3

(13) ltrx_begin(offset)
(14) A[0:7] = B[0:7] + t;
(15) if(A[0:7] < 0)
(16)     ltrx _abort( );
(17) ltrx end( );
Offset: (3-7) { (Code 1) // ltrx fallback }

The lightweight RTM instructions shown in Table 3 allow the speculative optimization via RTM to avoid the overhead involved with the use of lock elision based RTM implementations. In one embodiment, lightweight RTM instructions are provided to specify the beginning (e.g., ltrx_begin at line (13)) and the end (e.g., ltrx_end at line (17)) of a lightweight transactional region. When the processor successfully reaches the end of a lightweight RTM region, the transaction may commit without being blocked by the commit requirements. In one embodiment, a separate lightweight abort instruction (e.g., ltrx_abort at line (13)) is also provided.

A processor that is executing instructions within the lightweight transactional region performs different operations in comparison to a processor executing instructions in an RTM region configured for SLE. For example, a SIMD instruction to implement the vector operation of line (14) does not set read bits for the transactional attributes in the speculative cache (e.g., 1011.r, 1016.r, 1021.r, 1026.r of FIG. 10). Eliding the setting of the speculative read bits for the cache data lines storing the elements B[0:7] saves processor execution resources and reduces the logic required to implement the lightweight RTM implementation when compared with speculative lock elision based RTM implementations.

Avoiding the setting of the read bits allows several reductions in overhead for a lightweight RTM implementation in comparison with an RTM implementation for SLE. For example, in one embodiment, a processor includes an RTM implementation for use in SLE, while also supporting speculative load execution for instructions within the out-of-order window. In such processors, an extra "senior" load is dispatched after the load retires to set the speculative read bit in the cache. A senior load is a load instruction that is retired before execution, improving performance by allowing instructions that have been completed and were dispatched after the senior load to be retired without delay. Embodiments implementing lightweight RTM may omit the extra senior load dispatch due to the elimination of the commit requirement. Omitting the extra senior load dispatch may reduce the load port pressures within the processor. Reducing load port pressure allows processor designers to reduce the amount of processor die area consumed when implementing the senior load queue of the processor, although logic and die area may still be reserved for use by conventional RTM implementations.

In one embodiment, implementing Lightweight RTM avoids region rollbacks that occur due to a read bit overflow on the speculative cache. A read bit overflow occurs when a cache region (e.g., cache-line) that has been marked as speculatively read is overwritten by other data (e.g., other speculative data), for example, due to exhausting the resources in the speculative cache. While RTM implementations exist which can reduce the risks associated with read bit overflow (e.g., using compression filters to track transactional reads, multi-level speculative caches, etc.), embodiments without such details cannot perform a cache line evict for cache lines containing speculative data. An eviction of a cache line containing speculative data would result in a speculative data leak, which may harm other concurrently executing threads. Thus, in many RTM implementations a speculative cache read bit overflow causes a transaction abort. However, embodiments using lightweight RTM can operate without risk of cache read bit overflow.

In one embodiment, lightweight RTM avoids the stall of the region commit due to the draining of the sensor store buffer. In code 3, the region may commit without waiting for all the stores to A[0:7] to be globally visible. The draining of the senior store buffer for global observable stores is a known overhead of store fences and locked instructions in some processor architectures. Thus, speculative optimization using lightweight RTM can realize improved performance over speculative optimization using existing hardware based RTM implementations.

In one embodiment, lightweight RTM avoids an unnecessary region rollback due to false memory conflicts on load operations. In existing RTM implementations a concurrent thread that updates irrelevant data that is cached on the same cache lines as the data for vector elements B[0:7] may cause the region to abort and rollback. For example, an update to unrelated data stored in a portion of cache line 915 FIG. 9 may cause a transaction abort, even if the update is unrelated to the transactionally loaded cached data element 901A. Such spurious rollback would not occur in an embodiment of lightweight RTM as described herein. Any true conflicts in involving transactional load and concurrent data access can be resolved via programmer-implemented locks. In one embodiment, such locks may also be optimized at run-time or compile time in a separate transactional region using a lock elision based RTM implementation.

Figure 12:
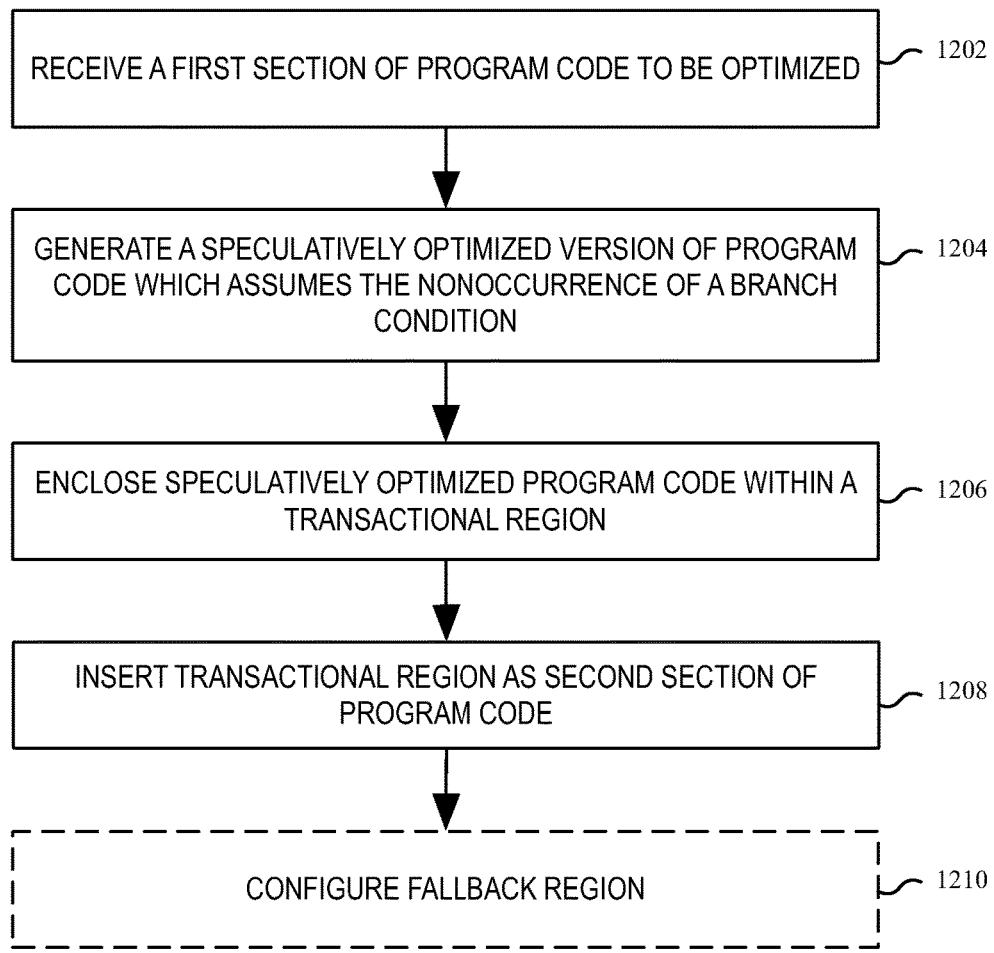
FIG. 12 is a flow diagram for logic to optimize program code utilizing a transactional memory region, according to an embodiment.

FIG. 12 is a flow diagram for logic to optimize program code utilizing a transactional memory region, according to an embodiment. In one embodiment, a first section of program code is transmitted to an optimizing compiler and, as shown at block 1202, the compiler, or an optimization module within the compiler receives the first section of program code. At block 1204 the optimization logic generates a speculatively optimized version of program code that assumes the nonoccurrence of a control or data event or condition.

At block 1206 the optimization logic encloses the speculatively optimized program code in a transactional region using markers or instructions. The markers or instructions are to indicate to the transactional memory implementation that the speculatively optimized version of the program code is to be implemented as an atomic transaction. At block 1208 the optimization logic inserts the transactional region into the program code as a section of the program code. In one embodiment, the optimization logic replaces the original section of program code with the optimized program code. At block 1210 a fallback region is configured for execution in the event of a transaction abort.

Figure 13:
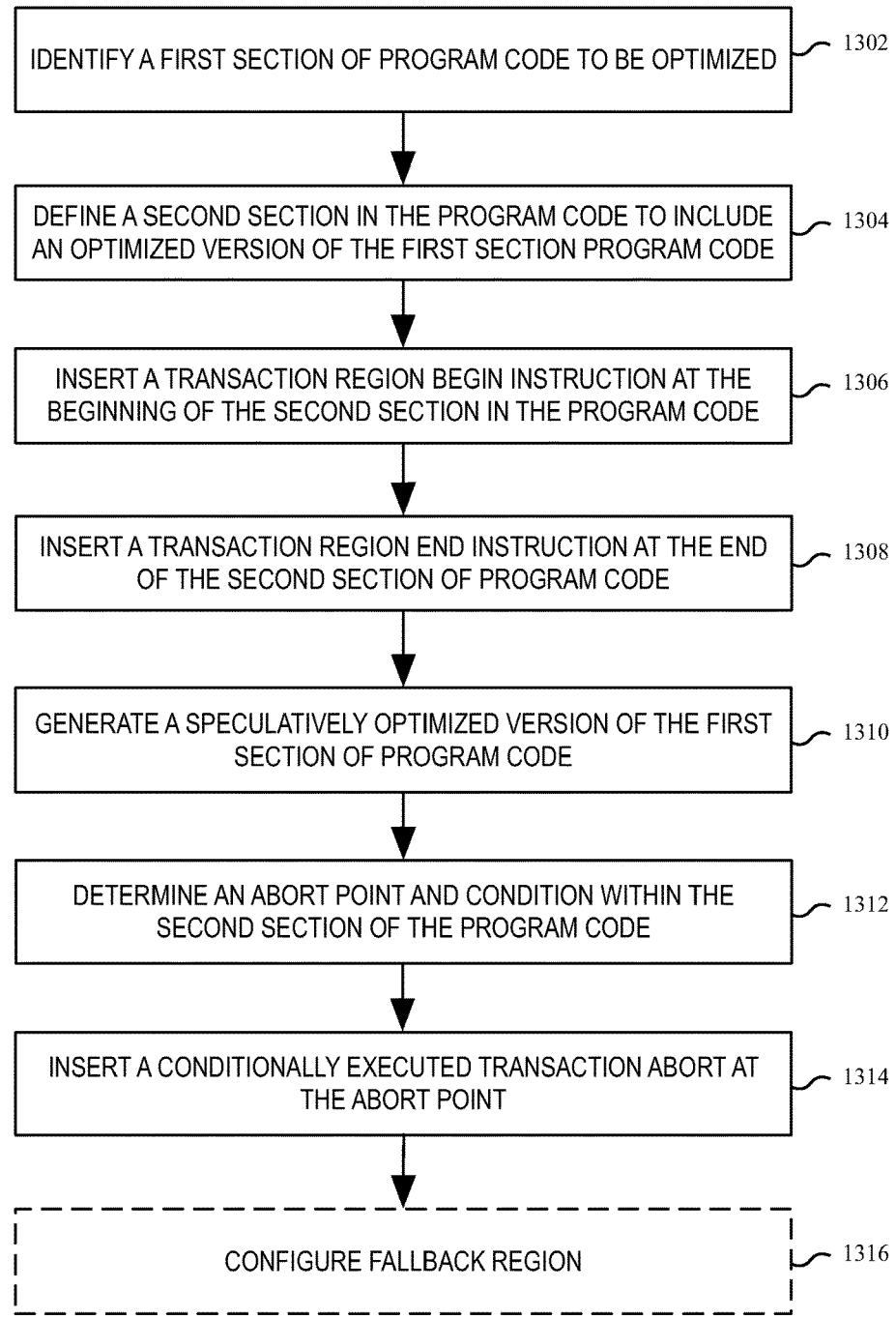
FIG. 13 is a flow diagram for logic to optimize program code utilizing one or more transactional memory regions, according to an embodiment.

FIG. 13 is a flow diagram for logic to optimize program code utilizing one or more transactional memory regions, according to an embodiment. At block 1302, a section of program code to be optimized is identified. This section may be designated as a first section of program code. As shown at block 1304, an embodiment of the optimization logic defines a second section in the program code that will include an optimized version of the first section of the program code. In one embodiment, the section of code identified for optimization is to be transformed into a speculatively optimized representation of the program code to be executed within a transactional memory region. The transactional region may be executed on a processing device having any restricted transactional memory region implementation described herein. In one embodiment, the transactional region is configured to execute on a processor including a lightweight restricted transactional memory region implementation designed for use in speculative compiler optimization.

At block 1306 the optimization logic inserts an instruction to indicate the beginning of a transaction region at the beginning of the second section in the program code. At block 1308 the optimization logic inserts an instruction to indicate the end of the transaction region at the end of the second section in the program code.

At block 1310 the optimization logic generates a speculatively optimized version of the first section of the program code. The speculative optimization includes, but is not limited to speculative vectorization of iterative program code, including the insertion of vector load/gather/store/scatter operations, or other vector instructions that perform a single instruction or operation across multiple data elements. A few additional and non-limiting examples of speculative code optimization that may be performed include data-flow optimization, code generation optimization, bounds check elimination, branch offset optimization, unused code elimination, or jump threading.

At block 1312, a conditional abort point and an abort condition are determined. Note that multiple conditional abort points may be determined or assigned within a region of code to be optimized, but for the ease of discussion only one abort point has been discussed in detail. Determining a conditional abort point may be based on any code analysis algorithm to determine when speculative transactional execution can no longer proceed. Additionally, the hardware implementation may trigger an automatic abort during execution of the transaction region for various reasons including a speculative cache overflow or a data conflict caused by a load or store operation.

At block 1314 the optimization logic inserts a conditionally executed transaction abort at the abort point. In one embodiment, the transaction abort is an abort instruction to indicate to the transactional memory logic to rollback the transaction region. At block 1316 the optimization logic configures a fallback region, which may be a less aggressively optimized version of the first section of program code. Less aggressively optimized means that the fallback utilized can be an optimized version of the first section of program code, but one that is not speculatively optimized to assume the nonoccurrence of a branch or data condition. In one embodiment, multiple nested transaction memory regions can be assembled and the less aggressively optimized version of program code used as a fallback region is a transactional memory region with a higher chance of success or a significantly less frequent abort condition.

Although the flow diagrams of FIG. 12 and FIG. 13 are illustrated in a substantially serial fashion, the logic illustrated may be performed in a different order than shown. Moreover, portions of the logic can be performed in parallel with other portions.

As described herein, program code may refer to compiler code, optimization code, application code, library code, or any other known formulation of code. For example, program code includes code to be executed on any one or more of the processors described herein. In one embodiment a binary optimizer configured to optimize compiled program code is equivalent to the compiler optimization of un-compiled program code. The insertion of code (operations, function calls, etc.) and optimization of the code is performed though execution of different program code, such us compiler and/or optimization code via one or more processors. For example, optimization code may be dynamically executed on a processor at runtime to optimize program code just-in-time (JIT) for execution of the program code on the processor.

In one embodiment, identifying a section of program code to be optimized includes the code indicating a section/region of program code to be optimized. For example, a specific instruction or demarcation is utilized to indicate a section of code to be optimized or would likely benefit from optimization. As another option, a programmer provides hints regarding sections of the program code, which are utilized by optimization code to identify sections for optimization. In another embodiment, a region is identified/selected based on profiling information. For example, program code is profiled during execution by hardware, software executing on the processor, firmware, or a combination thereof. Here, profiling of the code generates hints or modifies original software hints, as well as provide direct identification of regions for optimizations. In addition, a section of code is potentially identified by certain attributes, such as a specific type, format, or order of the code. As a specific illustrative example, code including loops are targeted for potential optimization. Profiling of the loops during execution determines which of the loops should be optimized. Also, if the loop includes specific code, such as loads and stores, that are to be optimized, then the region including such code is identified for optimization.

As used herein, "optimization" is defined as one or more operations designed to improve the performance of source code. The terms "optimize" and "optimization" referred to throughout this document specifically refer to performing modifications to code. These optimizations are normally performed with the intent to improve the performance throughput of the code. However, there are certain optimizations that either have other intents or other results. In certain cases optimizations may be performed on code to modify the resulting output data collected upon execution of the code rather than attempting to improve any performance throughput of the code. Additionally, optimizations could also be performed to modify the data collection capability of performance monitoring code among other goals. In other potential cases, code optimizations could be introduced into the code with the intent to achieve a gain in performance throughput of the code, only to not achieve a gain whatsoever and possibly result in unwanted performance degradation due to unforeseen circumstances.

Therefore, the terms "optimize" and "optimization" do not specifically refer to an optimal configuration of code that will achieve ideal performance. It is not necessarily the case that any "optimization" as referred to within this document could result in truly optimal performance (e.g., the best theoretical performance throughput). Rather, references to "optimizing" and "optimizations" within this document signify attempts at restructuring code to either potentially gain some level of performance improvement over the original code or to modify some other aspect of the code for the benefit of the user (e.g. modifying the resulting output as referred to above). If the "optimization" was meant to achieve a performance improvement, then whether a real performance improvement is achieved is entirely dependent upon the types of modifications performed, the specific structure and behavior of the original code, and the environment in which the code is executed within. Exemplary binary optimization operations include memory operations, for example, reordering load and/or store instructions, and non-memory operations such as eliminating unused code, or otherwise streamlining the source binary code.

Lightweight RTM Implementation

Figure 14:
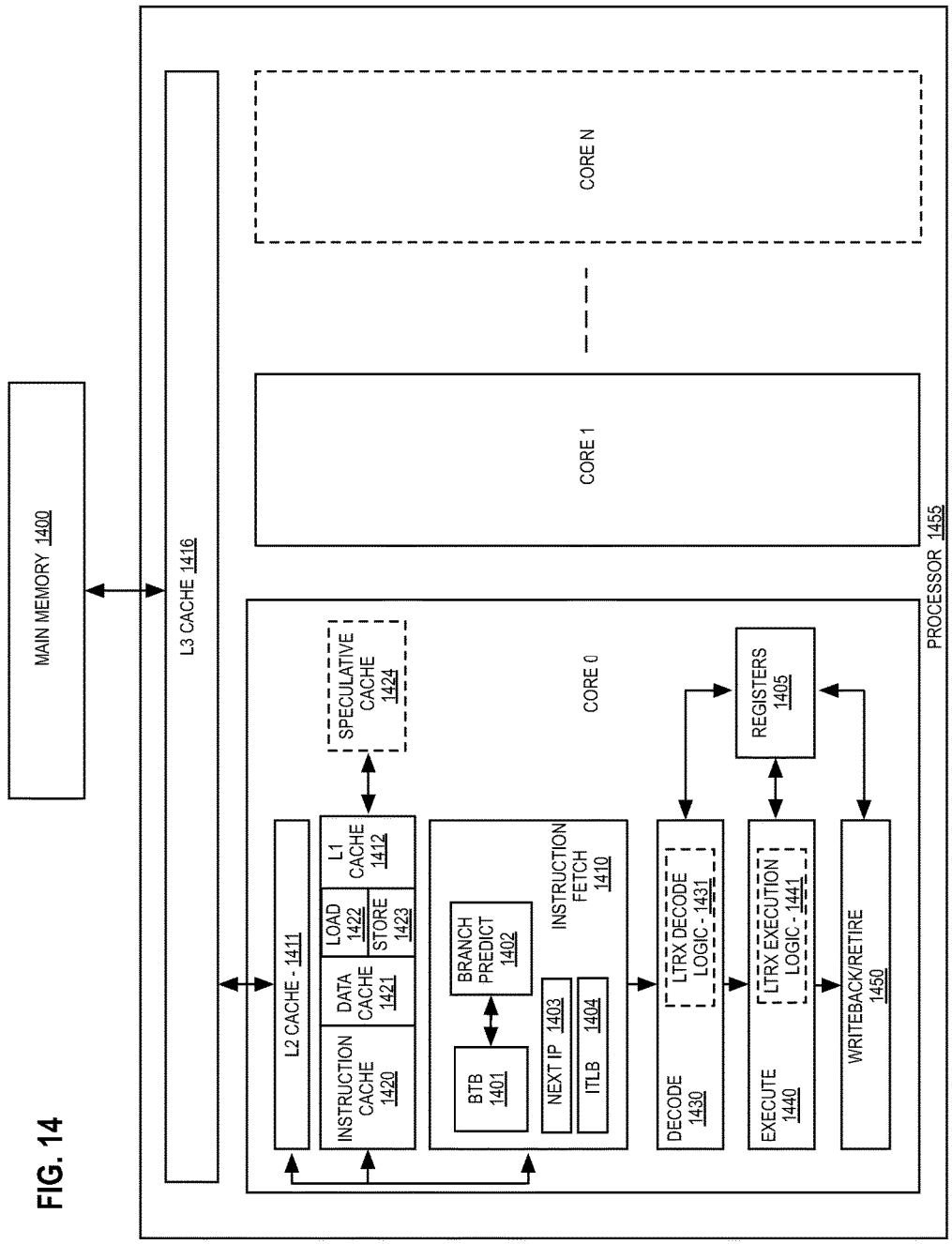
FIG. 14 is a block diagram of a processing system including a lightweight RTM implementation, according to an embodiment.

FIG. 14 is a block diagram illustrating a lightweight RTM implementation according to an embodiment. An exemplary processor 1455 including a lightweight RTM implementation may include a dedicated speculative cache 1424 or may task portions of another internal cache, such as the data cache 1421, for use as a speculative cache to serve as a restricted transactional memory for instructions within a transactional region. In one embodiment, processing memory instructions (e.g., load/store instructions) includes allocating, de-allocating, and utilizing space within a load buffer 1422 and a store buffer 1423. The operation of the load buffer 1422 and the store buffer 1423 are configured to support lightweight RTM transactions. For lightweight transactions, conflict detection is performed for store operations in the region. However, as embodiments implementing lightweight RTM assume no true data conflicts will occur during a lightweight transaction.

Thus, in one embodiment conflict detection is not performed for load operations in the region. In one embodiment a processor executing instructions within a lightweight RTM region does not abort on false data conflicts (e.g., a write to unrelated data on the same cache line as speculative data if the speculative data is not disturbed). In one embodiment, the processor does not require an atomic commit at the end of a transaction. When a lightweight RTM region commits the region is not required to appear to execute atomically (e.g., without interleaving with other concurrent threads). For lightweight RTM it is sufficient to ensure that when a transaction region aborts, all the stores in the region are invisible to concurrent threads and can be completely rolled back without any side effects. In one embodiment, a cache coherence protocol is used to snoop possible memory conflicts from caused by transactional store instructions performed during within the lightweight RTM region. In one embodiment, the cache coherency protocol tracks cache line write attributes (e.g., 1011.r, 1016.r, 1021.r, 1026.r of FIG. 10) set when executing store instructions within a lightweight transactional region.

As mentioned above, a new set of lightweight transactional memory instructions (e.g., ltrx instructions) indicate to the processor that a set of instructions are to be executed as a transaction. The illustrated embodiment includes a decode unit 1430 with decode logic 1431 for decoding the lightweight RTM instructions. Additionally, an execution unit 1440 with includes additional execution logic 1441 for executing the lightweight RTM instructions. Additionally, a register set 1405 provides register storage for operands, control data and other types of data as the execution unit 1440 executes the instruction stream.

The details of a single processor core ("Core 0") are illustrated in FIG. 14 for simplicity. It will be understood, however, that each core shown in FIG. 14 may have the same set of logic as Core 0. As illustrated, each core may also include a dedicated Level 1 (L1) cache 1412 and Level 2 (L2) cache 1411 for caching instructions and data according to a specified cache management policy. The L1 cache 1411 includes a separate instruction cache 1420 for storing instructions and a separate data cache 1421 for storing data. The instructions and data stored within the various processor caches are managed at the granularity of cache lines, which may be a fixed size (e.g., 64, 128, 512 Bytes in length). Each core of this exemplary embodiment has an instruction fetch unit 1410 for fetching instructions from main memory 1400 and/or a shared Level 3 (L3) cache 1416; a decode unit 1420 for decoding the instructions; an execution unit 1440 for executing the instructions; and a writeback unit 1450 for retiring the instructions and writing back the results.

The instruction fetch unit 1410 includes various well known components including a next instruction pointer 1403 for storing the address of the next instruction to be fetched from memory 1400 (or one of the caches); an instruction translation look-aside buffer (ITLB) 1404 for storing a map of recently used virtual-to-physical instruction addresses to improve the speed of address translation; a branch prediction unit 1402 for speculatively predicting instruction branch addresses; and branch target buffers (BTBs) 1401 for storing branch addresses and target addresses. Once fetched, instructions are then streamed to the remaining stages of the instruction pipeline including the decode unit 1430, the execution unit 1440, and the writeback unit 1450.

Figure 15:
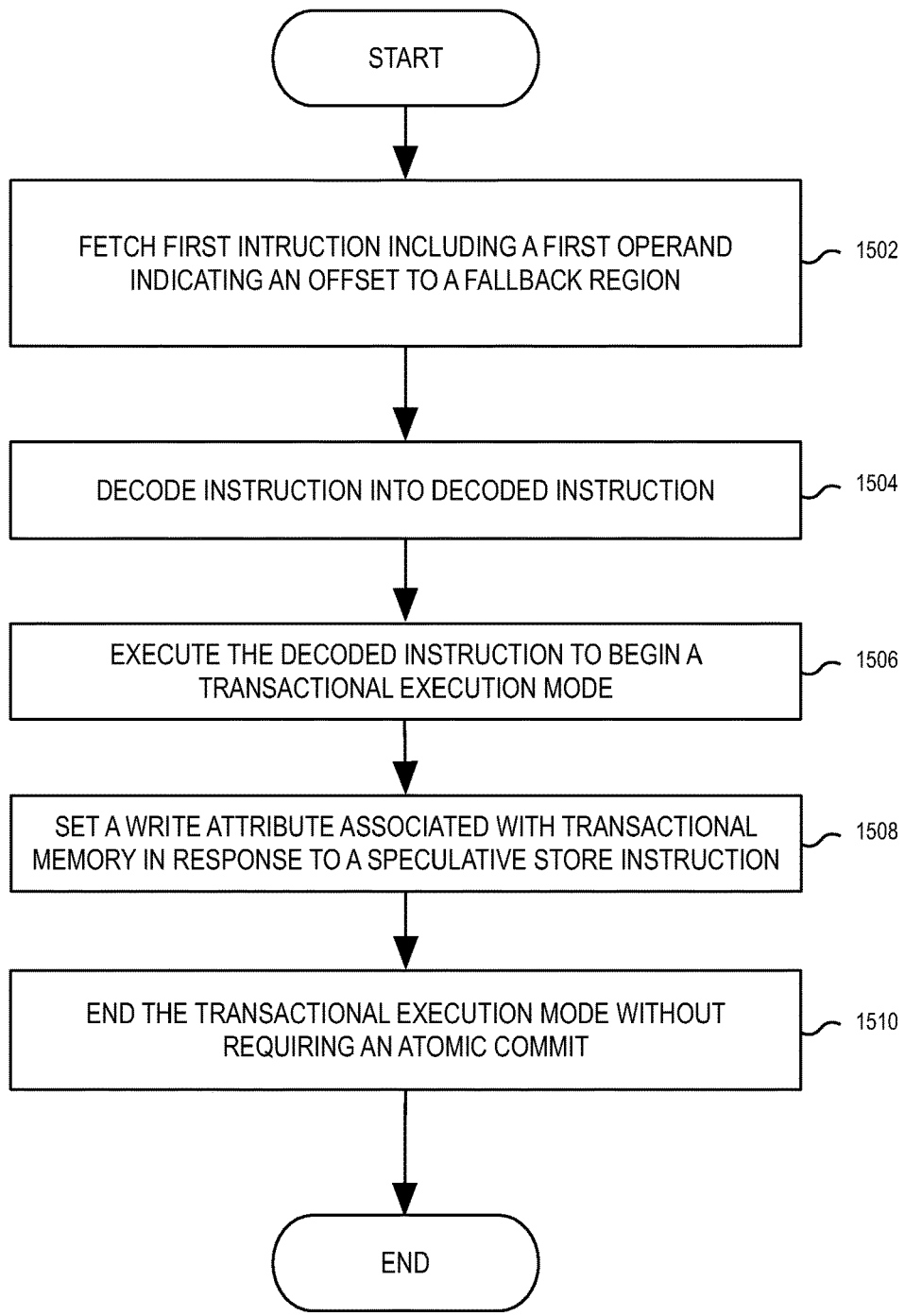
FIG. 15 is a flow diagram for logic to process lightweight RTM instructions, according to an embodiment.

FIG. 15 is a flow diagram for logic to process lightweight RTM instructions, according to an embodiment. At block 1502, the instruction pipeline beings with a fetch of an instruction including a first operand that indicates an offset to a fallback region. At block 1504, the processor decodes the instruction into a decoded instruction. In one embodiment, the decoded instruction is a single operation. In one embodiment the decoded instruction is includes one or more logical micro-operations to perform each sub-element of the instruction. The micro-operations can be hard-wired or microcode operations to can cause components of the processor, such as an execution unit, to perform various operations to implement the instruction.

At block 1506 the execution unit of the processor executes the decoded instruction. In one embodiment the decoded instruction causes the processor to enter a transactional execution mode where instructions in a transactional region are executed using transactional memory. As shown at block 1508, executing instructions within the transactional region causes the execution unit to set a write attribute associated with transactional memory in response to a speculative store instruction. In other words, speculative stores executed within the transactional region are tracked for data conflicts. In one embodiment, speculative loads executed within the transactional region are not tracked for data conflicts. At block 1510, the execution unit exits the transactional mode by committing the transactional memory to non-transactional memory. In one embodiment, the execution unit exits the transactional mode automatically without requiring an atomic commit (e.g., may exit non-atomically). For example, the execution unit may exit the transactional mode without blocking based on a pending senior store instruction. Lightweight RTM instructions as described herein may be encoded in any one of the exemplary instruction formats described below.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 16A:
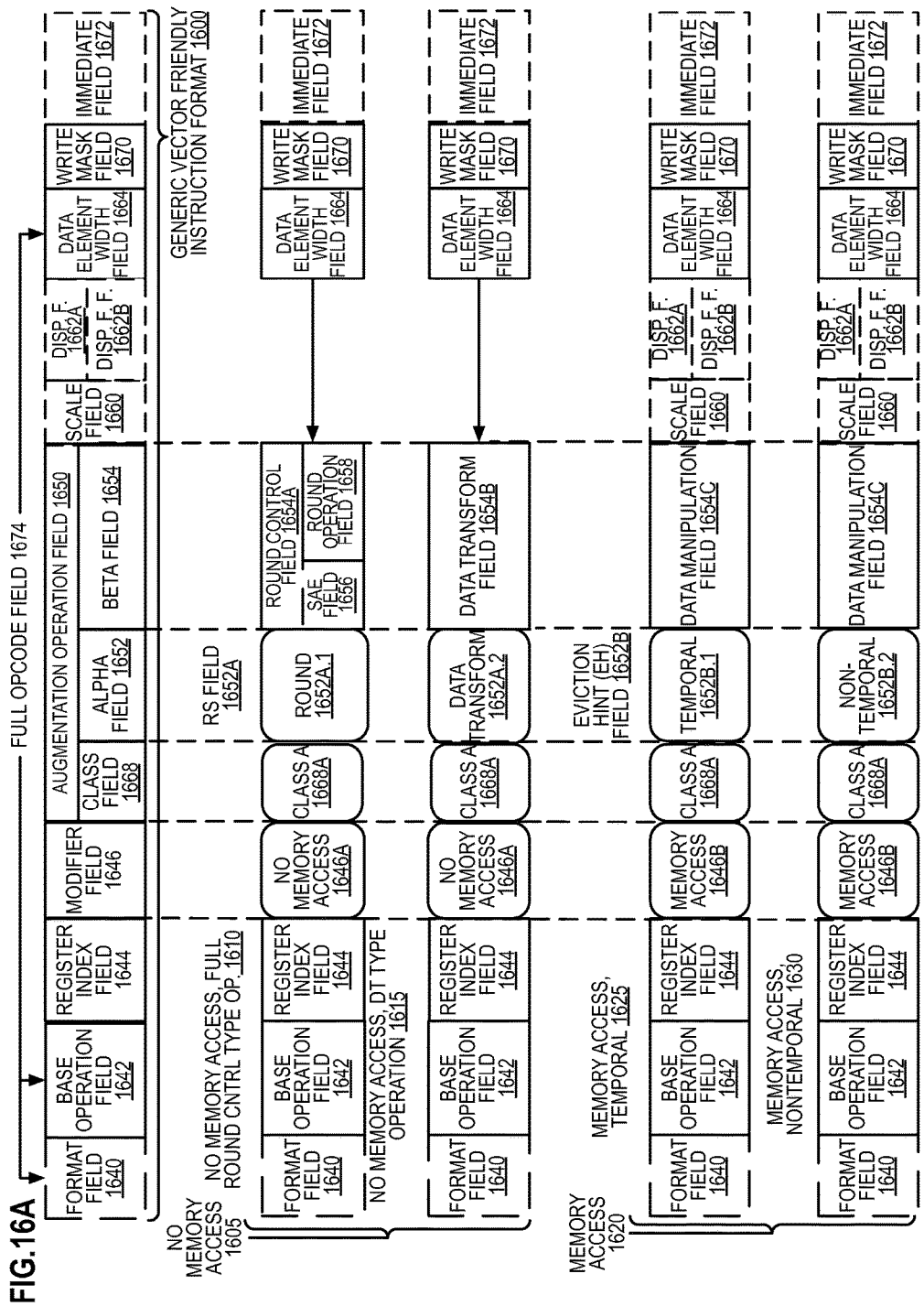
FIGS. 16A-16B are block diagrams illustrating a generic vector friendly instruction format and instruction templates thereof according to embodiments.
Figure 16B:
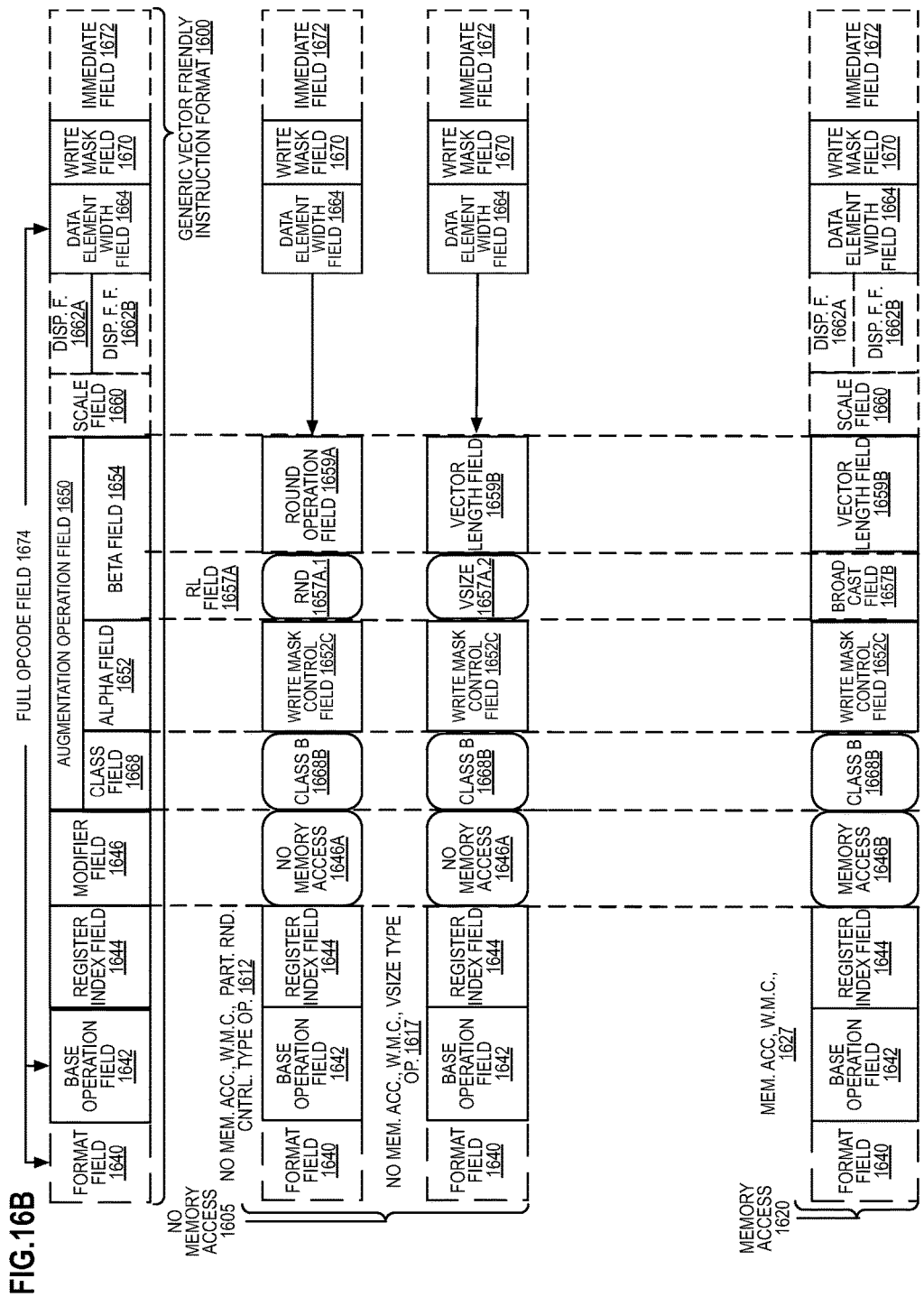

FIGS. 16A-16B are block diagrams illustrating a generic vector friendly instruction format and instruction templates thereof according to an embodiment. FIG. 16A is a block diagram illustrating a generic vector friendly instruction format and class A instruction templates thereof according to an embodiment; while FIG. 16B is a block diagram illustrating the generic vector friendly instruction format and class B instruction templates thereof according to an embodiment. Specifically, a generic vector friendly instruction format 1600 for which are defined class A and class B instruction templates, both of which include no memory access 1605 instruction templates and memory access 1620 instruction templates. The term generic in the context of the vector friendly instruction format refers to the instruction format not being tied to any specific instruction set.

Embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes). However, alternate embodiments support more, less and/or different vector operand sizes (e.g., 256 byte vector operands) with more, less, or different data element widths (e.g., 128 bit (16 byte) data element widths).

The class A instruction templates in FIG. 16A include: 1) within the no memory access 1605 instruction templates there is shown a no memory access, full round control type operation 1610 instruction template and a no memory access, data transform type operation 1615 instruction template; and 2) within the memory access 1620 instruction templates there is shown a memory access, temporal 1625 instruction template and a memory access, non-temporal 1630 instruction template. The class B instruction templates in FIG. 16B include: 1) within the no memory access 1605 instruction templates there is shown a no memory access, write mask control, partial round control type operation 1612 instruction template and a no memory access, write mask control, vsize type operation 1617 instruction template; and 2) within the memory access 1620 instruction templates there is shown a memory access, write mask control 1627 instruction template.

The generic vector friendly instruction format 1600 includes the following fields listed below in the order illustrated in FIGS. 16A-16B.

Format field 1640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1642—its content distinguishes different base operations.

Register index field 1644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1646—its content distinguishes occurrences of instructions in the generic vector instruction format that specify memory access from those that do not; that is, between no memory access 1605 instruction templates and memory access 1620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1650—its content distinguishes which one of a variety of different operations to be performed in addition to the base operation. This field is context specific. In one embodiment of the invention, this field is divided into a class field 1668, an alpha field 1652, and a beta field 1654. The augmentation operation field 1650 allows common groups of operations to be performed in a single instruction rather than 2, 3, or 4 instructions.

Scale field 1660—its content allows for the scaling of the index field's content for memory address generation (e.g., for address generation that uses $2^{scale}*$index+base).

Displacement Field 1662A—its content is used as part of memory address generation (e.g., for address generation that uses $2^{scale}*$index+base+displacement).

Displacement Factor Field 1662B (note that the juxtaposition of displacement field 1662A directly over displacement factor field 1662B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1674 (described later herein) and the data manipulation field 1654C. The displacement field 1662A and the displacement factor field 1662B are optional in the sense that they are not used for the no memory access 1605 instruction templates and/or different embodiments may implement only one or none of the two.

Data element width field 1664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1670 allows for partial vector operations, including loads, stores, arithmetic, logical, etc. While embodiments are described in which the write mask field's 1670 content selects one of a number of write mask registers that contains the write mask to be used (and thus the write mask field's 1670 content indirectly identifies that masking to be performed), alternative embodiments instead or additional allow the mask write field's 1670 content to directly specify the masking to be performed.

Immediate field 1672—its content allows for the specification of an immediate. This field is optional in the sense that is it not present in an implementation of the generic vector friendly format that does not support immediate and it is not present in instructions that do not use an immediate.

Class field 1668—its content distinguishes between different classes of instructions. With reference to FIGS. 16A-B, the contents of this field select between class A and class B instructions. In FIGS. 16A-B, rounded corner squares are used to indicate a specific value is present in a field (e.g., class A 1668A and class B 1668B for the class field 1668 respectively in FIGS. 16A-B).

Instruction Templates of Class A

In the case of the non-memory access 1605 instruction templates of class A, the alpha field 1652 is interpreted as an RS field 1652A, whose content distinguishes which one of the different augmentation operation types are to be performed (e.g., round 1652A.1 and data transform 1652A.2 are respectively specified for the no memory access, round type operation 1610 and the no memory access, data transform type operation 1615 instruction templates), while the beta field 1654 distinguishes which of the operations of the specified type is to be performed. In the no memory access 1605 instruction templates, the scale field 1660, the displacement field 1662A, and the displacement scale filed 1662B are not present.

No-Memory Access Instruction Templates—Full Round Control Type Operation

In the no memory access full round control type operation 1610 instruction template, the beta field 1654 is interpreted as a round control field 1654A, whose content(s) provide static rounding. While in the described embodiments the round control field 1654A includes a suppress all floating point exceptions (SAE) field 1656 and a round operation control field 1658, alternative embodiments may support may encode both these concepts into the same field or only have one or the other of these concepts/fields (e.g., may have only the round operation control field 1658).

SAE field 1656—its content distinguishes whether or not to disable the exception event reporting; when the SAE field's 1656 content indicates suppression is enabled, a given instruction does not report any kind of floating-point exception flag and does not raise any floating point exception handler.

Round operation control field 1658—its content distinguishes which one of a group of rounding operations to perform (e.g., Round-up, Round-down, Round-towards-zero and Round-to-nearest). Thus, the round operation control field 1658 allows for the changing of the rounding mode on a per instruction basis. In one embodiment of the invention where a processor includes a control register for specifying rounding modes, the round operation control field's 1650 content overrides that register value.

No Memory Access Instruction Templates—Data Transform Type Operation

In the no memory access data transform type operation 1615 instruction template, the beta field 1654 is interpreted as a data transform field 1654B, whose content distinguishes which one of a number of data transforms is to be performed (e.g., no data transform, swizzle, broadcast).

In the case of a memory access 1620 instruction template of class A, the alpha field 1652 is interpreted as an eviction hint field 1652B, whose content distinguishes which one of the eviction hints is to be used (in FIG. 16A, temporal 1652B.1 and non-temporal 1652B.2 are respectively specified for the memory access, temporal 1625 instruction template and the memory access, non-temporal 1630 instruction template), while the beta field 1654 is interpreted as a data manipulation field 1654C, whose content distinguishes which one of a number of data manipulation operations (also known as primitives) is to be performed (e.g., no manipulation; broadcast; up conversion of a source; and down conversion of a destination). The memory access 1620 instruction templates include the scale field 1660, and optionally the displacement field 1662A or the displacement scale field 1662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1652 is interpreted as a write mask control (Z) field 1652C, whose content distinguishes whether the write masking controlled by the write mask field 1670 should be a merging or a zeroing.

In the case of the non-memory access 1605 instruction templates of class B, part of the beta field 1654 is interpreted as an RL field 1657A, whose content distinguishes which one of the different augmentation operation types are to be performed (e.g., round 1657A.1 and vector length (VSIZE) 1657A.2 are respectively specified for the no memory access, write mask control, partial round control type operation 1612 instruction template and the no memory access, write mask control, VSIZE type operation 1617 instruction template), while the rest of the beta field 1654 distinguishes which of the operations of the specified type is to be performed. In the no memory access 1605 instruction templates, the scale field 1660, the displacement field 1662A, and the displacement scale filed 1662B are not present.

In the no memory access, write mask control, partial round control type operation 1610 instruction template, the rest of the beta field 1654 is interpreted as a round operation field 1659A and exception event reporting is disabled (a given instruction does not report any kind of floating-point exception flag and does not raise any floating point exception handler).

Round operation control field 1659A—just as round operation control field 1658, its content distinguishes which one of a group of rounding operations to perform (e.g., Round-up, Round-down, Round-towards-zero and Round-to-nearest). Thus, the round operation control field 1659A allows for the changing of the rounding mode on a per instruction basis. In one embodiment of the invention where a processor includes a control register for specifying rounding modes, the round operation control field's 1650 content overrides that register value.

In the no memory access, write mask control, VSIZE type operation 1617 instruction template, the rest of the beta field 1654 is interpreted as a vector length field 1659B, whose content distinguishes which one of a number of data vector lengths is to be performed on (e.g., 128, 256, or 512 byte).

In the case of a memory access 1620 instruction template of class B, part of the beta field 1654 is interpreted as a broadcast field 1657B, whose content distinguishes whether or not the broadcast type data manipulation operation is to be performed, while the rest of the beta field 1654 is interpreted the vector length field 1659B. The memory access 1620 instruction templates include the scale field 1660, and optionally the displacement field 1662A or the displacement scale field 1662B.

With regard to the generic vector friendly instruction format 1600, a full opcode field 1674 is shown including the format field 1640, the base operation field 1642, and the data element width field 1664. While one embodiment is shown where the full opcode field 1674 includes all of these fields, the full opcode field 1674 includes less than all of these fields in embodiments that do not support all of them. The full opcode field 1674 provides the operation code (opcode).

The augmentation operation field 1650, the data element width field 1664, and the write mask field 1670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 17 is a block diagram illustrating an exemplary specific vector friendly instruction format according to an embodiment. FIG. 17 shows a specific vector friendly instruction format 1700 that is specific in the sense that it specifies the location, size, interpretation, and order of the fields, as well as values for some of those fields. The specific vector friendly instruction format 1700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 16 into which the fields from FIG. 17 map are illustrated.

It should be understood that, although embodiments are described with reference to the specific vector friendly instruction format 1700 in the context of the generic vector friendly instruction format 1600 for illustrative purposes, the invention is not limited to the specific vector friendly instruction format 1700 except where claimed. For example, the generic vector friendly instruction format 1600 contemplates a variety of possible sizes for the various fields, while the specific vector friendly instruction format 1700 is shown as having fields of specific sizes. By way of specific example, while the data element width field 1664 is illustrated as a one bit field in the specific vector friendly instruction format 1700, the invention is not so limited (that is, the generic vector friendly instruction format 1600 contemplates other sizes of the data element width field 1664).

The generic vector friendly instruction format 1600 includes the following fields listed below in the order illustrated in FIG. 17A.

EVEX Prefix (Bytes 0-3) 1702—is encoded in a four-byte form.

Format Field 1640 (EVEX Byte 0, bits [7:0])—the first byte (EVEX Byte 0) is the format field 1640 and it contains 0x62 (the unique value used for distinguishing the vector friendly instruction format in one embodiment of the invention).

The second-fourth bytes (EVEX Bytes 1-3) include a number of bit fields providing specific capability.

REX field 1705 (EVEX Byte 1, bits [7-5])—consists of a EVEX.R bit field (EVEX Byte 1, bit [7]-R), EVEX.X bit field (EVEX byte 1, bit [6]-X), and 1657BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1610—this is the first part of the REX' field 1610 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1715 (EVEX byte 1, bits [3:0]-mmmm)—its content encodes an implied leading opcode byte (0F, 0F 38, or 0F 3).

Data element width field 1664 (EVEX byte 2, bit [7]-W)—is represented by the notation EVEX.W. EVEX.W is used to define the granularity (size) of the datatype (either 32-bit data elements or 64-bit data elements).

EVEX.vvvv 1720 (EVEX Byte 2, bits [6:3]-vvvv)— the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1720 encodes the 4 low-order bits of the first source register specifier stored in inverted (1s complement) form. Depending on the instruction, an extra different EVEX bit field is used to extend the specifier size to 32 registers.

EVEX.U 1668 Class field (EVEX byte 2, bit [2]-U)—If EVEX.U=0, it indicates class A or EVEX.U0; if EVEX.U=1, it indicates class B or EVEX.U1.

Prefix encoding field 1725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1652 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1654 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1610—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1670 (EVEX byte 3, bits [2:0]-kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1730 (Byte 4) is also known as the opcode byte. Part of the opcode is specified in this field.

MOD R/M Field 1740 (Byte 5) includes MOD field 1742, Reg field 1744, and R/M field 1746. As previously described, the MOD field's 1742 content distinguishes between memory access and non-memory access operations. The role of Reg field 1744 can be summarized to two situations: encoding either the destination register operand or a source register operand, or be treated as an opcode extension and not used to encode any instruction operand. The role of R/M field 1746 may include the following: encoding the instruction operand that references a memory address, or encoding either the destination register operand or a source register operand.

Scale, Index, Base (SIB) Byte (Byte 6)—As previously described, the scale field's 1650 content is used for memory address generation. SIB.xxx 1754 and SIB.bbb 1756—the contents of these fields have been previously referred to with regard to the register indexes Xxxx and Bbbb.

Displacement field 1662A (Bytes 7-10)—when MOD field 1742 contains 10, bytes 7-10 are the displacement field 1662A, and it works the same as the legacy 32-bit displacement (disp32) and works at byte granularity.

Displacement factor field 1662B (Byte 7)—when MOD field 1742 contains 01, byte 7 is the displacement factor field 1662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1662B is a reinterpretation of disp8; when using displacement factor field 1662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1662B substitutes the legacy x86 instruction set 8-bit displacement. Thus, the displacement factor field 1662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1672 operates as previously described.

Full Opcode Field

Figures 17A, 17B, 17C:
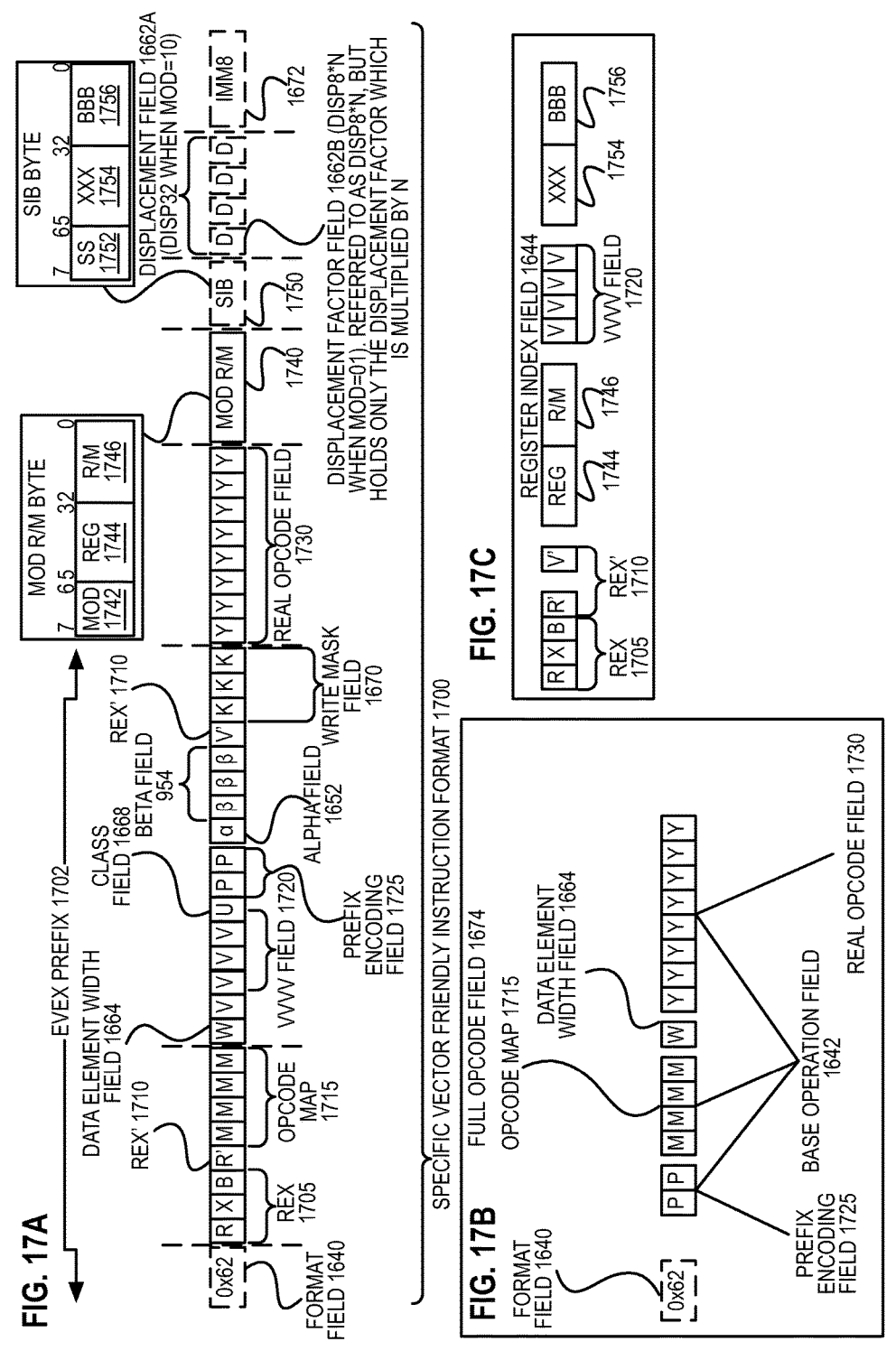

FIG. 17B is a block diagram illustrating the fields of the specific vector friendly instruction format 1700 that make up the full opcode field 1674 according to one embodiment of the invention. Specifically, the full opcode field 1674 includes the format field 1640, the base operation field 1642, and the data element width (W) field 1664. The base operation field 1642 includes the prefix encoding field 1725, the opcode map field 1715, and the real opcode field 1730.

Register Index Field

FIG. 17C is a block diagram illustrating the fields of the specific vector friendly instruction format 1700 that make up the register index field 1644 according to one embodiment of the invention. Specifically, the register index field 1644 includes the REX field 1705, the REX' field 1710, the MODR/M.reg field 1744, the MODR/M.r/m field 1746, the VVVV field 1720, xxx field 1754, and the bbb field 1756.

Augmentation Operation Field

Figure 17D:
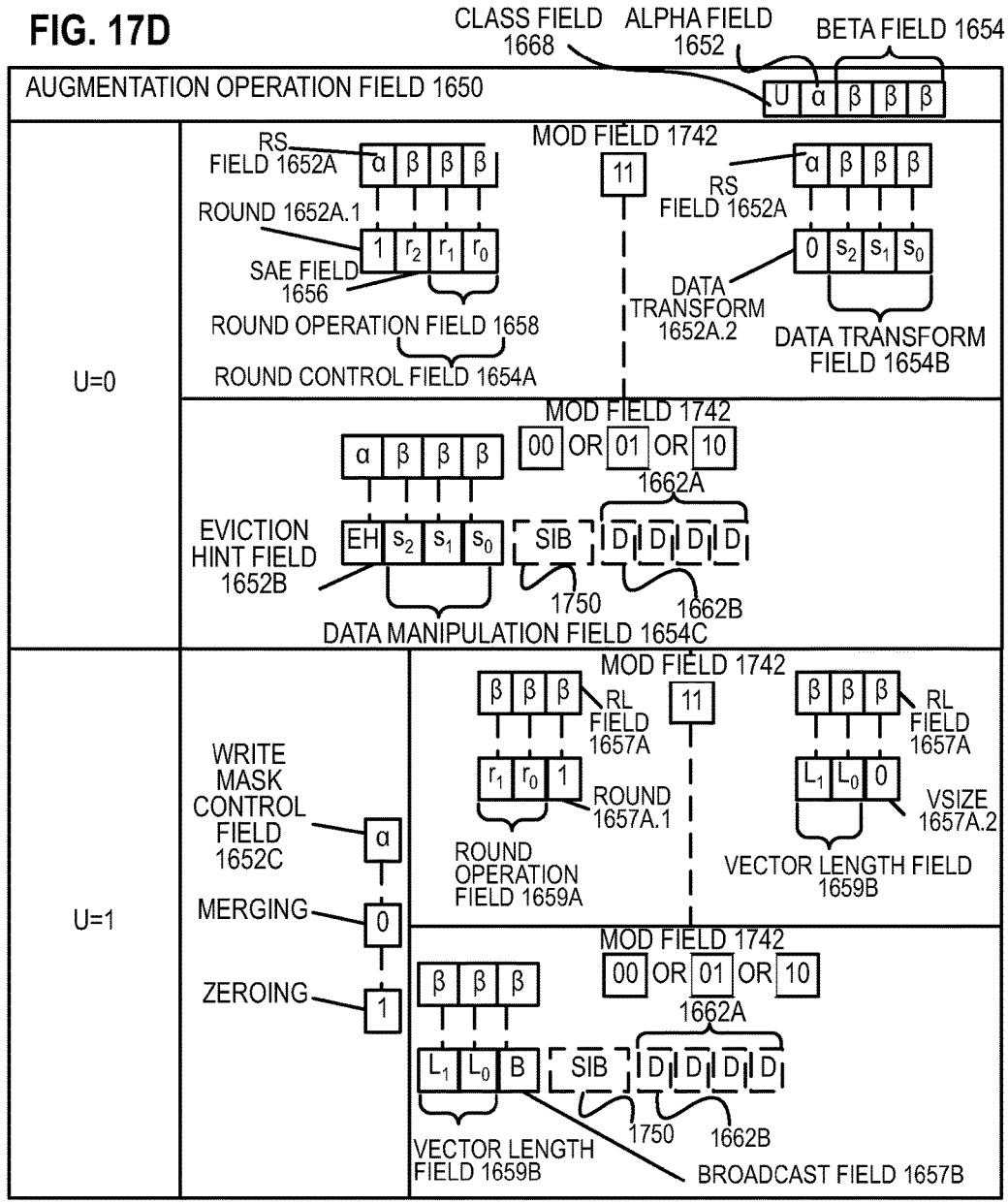

FIG. 17D is a block diagram illustrating the fields of the specific vector friendly instruction format 1700 that make up the augmentation operation field 1650 according to one embodiment of the invention. When the class (U) field 1668 contains 0, it signifies EVEX.U0 (class A 1668A); when it contains 1, it signifies EVEX.U1 (class B 1668B). When U=0 and the MOD field 1742 contains 11 (signifying a no memory access operation), the alpha field 1652 (EVEX byte 3, bit [7]-EH) is interpreted as the rs field 1652A. When the rs field 1652A contains a 1 (round 1652A.1), the beta field 1654 (EVEX byte 3, bits [6:4]-SSS) is interpreted as the round control field 1654A. The round control field 1654A includes a one bit SAE field 1656 and a two bit round operation field 1658. When the rs field 1652A contains a 0 (data transform 1652A.2), the beta field 1654 (EVEX byte 3, bits [6:4]-SSS) is interpreted as a three bit data transform field 1654B. When U=0 and the MOD field 1742 contains 00, 01, or 10 (signifying a memory access operation), the alpha field 1652 (EVEX byte 3, bit [7]-EH) is interpreted as the eviction hint (EH) field 1652B and the beta field 1654 (EVEX byte 3, bits [6:4]-SSS) is interpreted as a three bit data manipulation field 1654C.

When U=1, the alpha field 1652 (EVEX byte 3, bit [7]-EH) is interpreted as the write mask control (Z) field 1652C. When U=1 and the MOD field 1742 contains 11 (signifying a no memory access operation), part of the beta field 1654 (EVEX byte 3, bit [4]-$S_0$) is interpreted as the RL field 1657A; when it contains a 1 (round 1657A.1) the rest of the beta field 1654 (EVEX byte 3, bit [6-5]-$S_{2-1}$) is interpreted as the round operation field 1659A, while when the RL field 1657A contains a 0 (VSIZE 1657.A2) the rest of the beta field 1654 (EVEX byte 3, bit [6-5]-$S_{2-1}$) is interpreted as the vector length field 1659B (EVEX byte 3, bit [6-5]-$L_{1-0}$). When U=1 and the MOD field 1742 contains 00, 01, or 10 (signifying a memory access operation), the beta field 1654 (EVEX byte 3, bits [6:4]-SSS) is interpreted as the vector length field 1659B (EVEX byte 3, bit [6-5]-$L_{1-0}$) and the broadcast field 1657B (EVEX byte 3, bit [4]-B).

Exemplary Register Architecture

Figure 18:
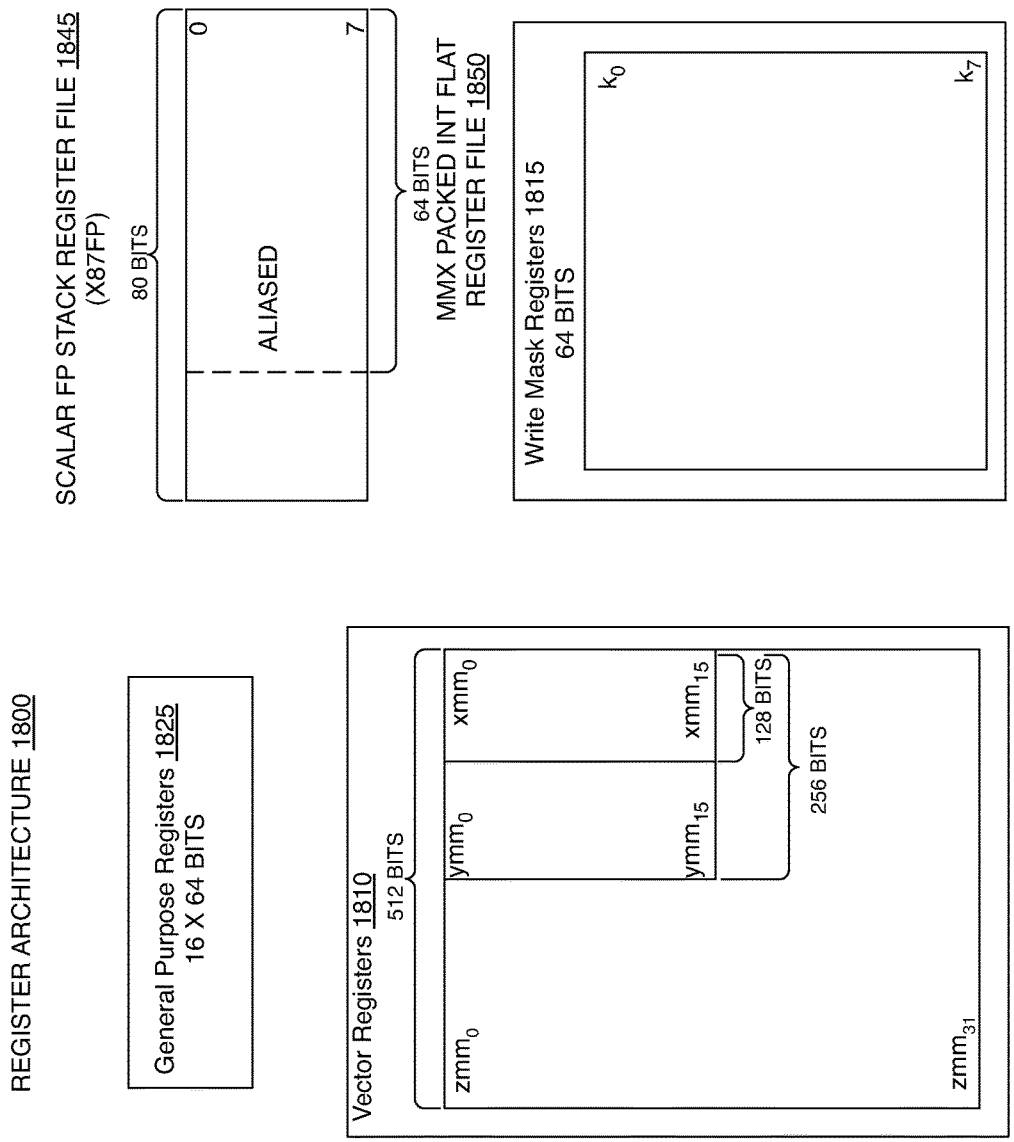
FIG. 18 is a block diagram of a register architecture according to an embodiment.

FIG. 18 is a block diagram of a register architecture 1800 according to one embodiment of the invention. In the embodiment illustrated, there are 32 vector registers 1810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1700 operates on these overlaid register file as illustrated in Table 4 below.

TABLE 4

Registers

| Adjustable Vector Length | Class | Operations | Registers |
| --- | --- | --- | --- |
| Instruction Templates that do not include the vector length field 1659B | A (FIG. 16A; U = 0) | 1610, 1615, 1625, 1630 | zmm registers (the vector length is 64 byte) |
|  | B (FIG. 16B; U = 1) | 1612 | zmm registers (the vector length is 64 byte) |
| Instruction Templates that do include the vector length field 1659B | B (FIG. 16B; U = 1) | 1617, 1627 | zmm, ymm, or xmm registers (the vector length is 64 byte, 32 byte, or 16 byte) depending on the vector length field 1659B |

In other words, the vector length field 1659B selects between a maximum length and one or more other shorter lengths, where each such shorter length is half the length of the preceding length; and instructions templates without the vector length field 1659B operate on the maximum vector length. Further, in one embodiment, the class B instruction templates of the specific vector friendly instruction format 1700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1815—in the embodiment illustrated, there are 8 write mask registers (k0 through k7), each 64 bits in size. In an alternate embodiment, the write mask registers 1815 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1845, on which is aliased the MMX packed integer flat register file 1850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The instructions described herein refer to specific configurations of hardware, such as application specific integrated circuits (ASICs), configured to perform certain operations or having a predetermined functionality. Such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well-known structures and functions were not described in elaborate detail in order to avoid obscuring the subject matter of the present invention. Accordingly, the scope and spirit of the invention should be judged in terms of the claims that follow.

What is claimed is:

1. A non-transitory machine-readable storage medium including instructions which, when executed by the machine, causes the machine to perform operations including:
   receiving a first section of program code to be optimized;
   generating speculatively optimized program code that assumes nonoccurrence of an abort condition; and
   enclosing the speculatively optimized program code within a transactional region using machine-level instructions, wherein enclosing the speculatively optimized program code within a transactional region using machine-level instructions includes inserting a transaction region end instruction into the program code and the transaction region end instruction causes the machine to commit results of the instructions within transactional memory to globally visible memory, wherein the transaction region end instruction is a first transaction region end instruction configured to perform a first non-atomic commit and the machine includes support for a second transaction region end instruction configured to block a second non-atomic commit.

2. The non-transitory machine-readable storage medium of claim 1, wherein the globally visible memory is visible to instructions in other execution threads.

3. The non-transitory machine-readable storage medium of claim 1, further comprising instructions to perform operations including:
   generating speculatively optimized version of a second section of the program code that assumes nonoccurrence of a lock condition; and
   enclosing the speculatively optimized version of the second section of the program code within a transactional region using machine-level instructions including at least the second transaction region end instruction.

4. The non-transitory machine-readable storage medium of claim 3 wherein enclosing the speculatively optimized program code within the transactional region using machine-level instructions includes configuring a fallback region for the transactional region.

5. The non-transitory machine-readable storage medium of claim 4 further comprising instructions to perform operations including inserting instructions into the program code to determine if the abort condition is to occur.

6. The non-transitory machine-readable storage medium of claim 5 further comprising instructions to perform operations including inserting an instruction into the program code to abort the transactional region, wherein the instruction to abort the transactional region is conditionally executed based on the abort condition.

7. The non-transitory machine-readable storage medium of claim 1 wherein enclosing the speculatively program code within a transactional region using machine-level instructions includes inserting a transaction region begin instruction into the program code and the transaction region begin instruction causes the machine to execute instructions within the region using transactional memory.

8. The non-transitory machine-readable storage medium of claim 7 wherein the transaction region begin instruction further causes the machine to set a speculative attribute associated with data stored in a speculative cache memory in response to a store instruction.

9. The non-transitory machine-readable storage medium of claim 8 wherein the transaction region begin instruction further causes the machine to not set a speculative attribute associate with data stored in the speculative cache memory in response to a load instruction.

10. The non-transitory machine-readable storage medium of claim 9 wherein the transaction region begin instruction is a first transaction region begin instruction and the machine includes support for a second transaction region begin instruction that causes the machine to set the speculative attribute associate with data stored in the speculative cache memory in response to a load instruction.

11. The non-transitory machine-readable storage medium of claim 1 wherein the transactional memory is speculative cache memory.

12. The non-transitory machine-readable storage medium of claim 11 wherein the speculative cache memory is a dedicated speculative cache.

13. A method comprising:
receiving a first section of program code to be optimized;
generating speculatively optimized program code that assumes nonoccurrence of an abort condition; and
enclosing the speculatively optimized program code within a transactional region using machine-level instructions, wherein enclosing the speculatively optimized program code within a transactional region using machine-level instructions includes inserting a transaction region end instruction into the program code and the transaction region end instruction causes a commit of results of the instructions within transactional memory to globally visible memory, wherein the transaction region end instruction is a first transaction region end instruction configured to perform a first non-atomic commit and a machine to perform the method includes support for a second transaction region end instruction configured to block a second non-atomic commit.

14. The method of claim 13, wherein the globally visible memory is visible to instructions in other execution threads.

15. The method of claim 13, further comprising:
generating speculatively optimized version of a second section of the program code that assumes nonoccurrence of a lock condition; and
enclosing the speculatively optimized version of the second section of the program code within a transactional region using machine-level instructions including at least the second transaction region end instruction.

16. The method of claim 15, wherein enclosing the speculatively optimized program code within the transactional region using machine-level instructions includes configuring a fallback region for the transactional region.

17. The method of claim 16, further comprising:
inserting instructions into the program code to determine if the abort condition is to occur.

18. The method of claim 17, further comprising:
inserting an instruction into the program code to abort the transactional region, wherein the instruction to abort the transactional region is conditionally executed based on the abort condition.

19. The method of claim 13, wherein enclosing the speculatively program code within a transactional region using machine-level instructions includes inserting a transaction region begin instruction into the program code and the transaction region begin instruction causes the machine to execute instructions within the region using transactional memory.

20. The method of claim 19, wherein the transaction region begin instruction further causes a speculative attribute associated with data stored in a speculative cache memory to be set in response to a store instruction.

21. The method of claim 16, wherein the transaction region begin instruction further causes a speculative attribute associate with data stored in the speculative cache memory to not be set in response to a load instruction.

* * * * *